United States Patent
Olsson et al.

(10) Patent No.: US 9,082,269 B2
(45) Date of Patent: Jul. 14, 2015

(54) HAPTIC DIRECTIONAL FEEDBACK HANDLES FOR LOCATION DEVICES

(75) Inventors: Mark S. Olsson, San Diego, CA (US); Garrett A. Newby, San Diego, CA (US); Alexander Logan Warren, San Diego, CA (US); David Cox, San Diego, CA (US)

(73) Assignee: SEE SCAN, INC., San Diego, CA (US)

( * ) Notice: Subject to any disclaimer, the term of this patent is extended or adjusted under 35 U.S.C. 154(b) by 133 days.

(21) Appl. No.: 13/570,084

(22) Filed: Aug. 8, 2012

(65) Prior Publication Data

US 2013/0207791 A1  Aug. 15, 2013

Related U.S. Application Data

(60) Provisional application No. 61/521,173, filed on Aug. 8, 2011, provisional application No. 61/615,850, filed on Mar. 26, 2012.

(51) Int. Cl.
*G08B 6/00* (2006.01)
*G01V 3/12* (2006.01)

(52) U.S. Cl.
CPC ... *G08B 6/00* (2013.01); *G01V 3/12* (2013.01)

(58) Field of Classification Search
CPC .............. G08B 13/248; G08B 13/1427; G08B 13/2462; G08B 13/187; G08B 13/2402; G08B 13/2448; G08B 13/2454; G08B 13/2471; G08B 13/2488; G08B 6/00; G06Q 10/00; G05D 7/06; G01V 3/08; G01V 3/081; G01V 3/086; G01V 3/012
USPC .................. 340/407.1, 407.2, 539.1, 539.21, 340/539.23, 552, 582, 573.1, 540; 324/66, 324/67, 326, 329; 342/22, 27, 66, 67, 326, 342/329; 345/161, 163
See application file for complete search history.

(56) References Cited

U.S. PATENT DOCUMENTS

| | | | | |
|---|---|---|---|---|
| 5,412,989 | A * | 5/1995 | Eberle et al. | 73/592 |
| 6,751,553 | B2 * | 6/2004 | Young et al. | 702/5 |
| 6,833,795 | B1 * | 12/2004 | Johnson et al. | 340/853.5 |
| 7,443,154 | B1 * | 10/2008 | Merewether et al. | 324/326 |
| 2005/0156600 | A1 * | 7/2005 | Olsson et al. | 324/329 |
| 2006/0267828 | A1 * | 11/2006 | Steinway et al. | 342/22 |
| 2011/0202277 | A1 * | 8/2011 | Haddad | 702/7 |

OTHER PUBLICATIONS

Garrett SuperWand flyer and website, 2007, Garland, Texas, USA, http://www.garrett.com/securitysite/security_super_scanner_main.aspx.

* cited by examiner

*Primary Examiner* — Hung T Nguyen
(74) *Attorney, Agent, or Firm* — Steve C. Tietsworth, Esq.

(57) ABSTRACT

Locating devices and systems providing haptic tactile feedback are disclosed. In one embodiment, a locator includes a haptic handle configured to provide directional signals through an operator's sense of touch to aid in locating and tracing a buried conductor or other object such as a pipe or cable.

46 Claims, 18 Drawing Sheets

Example Buried Object Locate Operation Using Locator
Embodiment with Haptic Handle and / or Switches
(Plan View)

Example Buried Object Locate Operation Using Locator Embodiment with Haptic Handle and / or Switches
(Plan View)

Example Buried Object Locate Operation Using Locator
Embodiment with Haptic Handle and / or Switches
(Plan View)

Example Buried Object Locate Operation Using Locator
Embodiment with Haptic Handle and / or Switches
(Plan View)

HAPTIC DIRECTIONAL FEEDBACK HANDLES FOR LOCATION DEVICES

CROSS-REFERENCE TO RELATED APPLICATIONS

This application claims priority under 35 U.S.C. §119(e) to U.S. Provisional Patent Application Ser. No. 61/521,173, filed Aug. 8, 2011, entitled HAPTIC DIRECTIONAL FEEDBACK HANDLE FOR LOCATION DEVICES, and U.S. Provisional Patent Application Ser. No. 61/615,850, filed Mar. 26, 2012, entitled HAPTIC DIRECTIONAL FEEDBACK HANDLES FOR LOCATION DEVICES, the contents of which are incorporated by reference herein in their entirety for all purposes.

FIELD

This disclosure relates generally to one or more locating systems and related accessories, apparatus, computer program products, and methods for directional navigation in various environments based on sensory feedback, including tactile feedback. More specifically, but not exclusively, this disclosure relates to electronic and mechanical systems including haptic feedback handles, along with methods for locating buried conductors, conduits, pipes and cables using haptic feedback in various environments, including urban environments.

BACKGROUND

There are many situations where is it desirable to locate buried utilities such as pipes and cables. For example, before starting any new construction that involves excavation, worker safety and economic concerns require the precise location and identification of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects".

Pipes and cables are often buried under roadways; thus, users engaging in a locate operation may be exposed to various roadway hazards, such as high traffic volume and/or speed, adverse weather conditions, poor visibility, etc. Existing utility locating systems traditionally interface with the user by providing auditory and/or visual feedback, associated with information about the location of the buried object. For example, some utility locating systems display images on a screen, such as arrows and/or emit an audible sound to provide left-right guidance toward a buried object. Such feedback mechanisms may, however, detract from a user's situational awareness under various work conditions. For example, relying on a visual display and/or auditory signals to trace a buried object in heavy traffic may pose a risk to both users conducting the locate operation, as well as drivers on the roadway.

Accordingly, there is a need in the art to address the above-described, as well as other problems.

SUMMARY

The present disclosure relates generally to utility locating systems, apparatus, and methods for providing directional information to a user about a buried object.

In one aspect, the disclosure relates to a system, a method, a computer program product, and a locator with means for providing tactile feedback to a user.

In another aspect, one or more feedback components may be configured to provide tactile feedback based on position information relating to a location of an object. The tactile feedback may be associated with a relative position of a locator (e.g., operated by a user) with respect to the location of the object.

In another aspect, the tactile feedback may indicate a direction in which the user a user may travel towards the object, an amount of distance between the user and the object, an orientation of the user with respect to the location of the object, a depth of the object below a surface, and/or other position information.

In yet another aspect, at least one feedback component may provide a time, frequency and/or amplitude modulated tactile feedback. The modulated feedback may indicate direction, distance, orientation, and/or depth of an object relative to a locator/user, or vice versa.

In yet another aspect, a feedback component may provide a first number of activation periods (e.g., pulses) corresponding to a first number of measurement units to indicate a first amount of distance between the user and the object at a first instance in time. The feedback component may further provide a second number of activation periods corresponding to a second number of measurement units to indicate a second amount of distance between the user and the object at a second instance in time. The second number of activation periods and the second number of measurement units may be less than the first number of activation periods and the first number of measurement units when the second amount of distance is less than the first amount of distance. The second number of activation periods and the second number of measurement units may be greater than the first number of activation periods and the first number of measurement units when the second amount of distance is greater than the first amount of distance.

In yet another aspect, a feedback component may provide different time, frequency, or amplitude modulated tactile feedback associated with different amounts of distance between the locator/user and the object at different instances of time, where shorter, more frequent, or stronger activation periods, respectively, are associated with shorter distances as compared to activation periods associated with longer distances.

In yet another aspect, a plurality of feedback components may be used to contact a user's body in order to convey position information. For example, feedback components like transducers (e.g., mechanical, acoustic, thermal, etc.) or other signaling components may be configured to contact the user's hand via a handle, or contact other portions of a user's body via clothing worn by the user, including feedback components that are coupled to or integrated with clothing (e.g., a vest, belt, one or more pocket inserts, one or more gloves, waist band, one or more wristbands/watches, one or more ankle bands or socks, a headband or hat, right and left shoulder pads, front and back shoulder pads on right and left shoulders). Such clothing-based feedback may be controlled using wired or wireless means (e.g., known wireless communication protocols from a locator or a smart phone).

In yet another aspect, a buried object locator includes one or more feedback components disposed within a handle of the buried object locator, and a locator module configured to determine position information relating to a location of a buried object. In another aspect, the buried object locator includes a processing module configured to generate, based at least in part on the position information, one or more control signals that control some or all of the tactile feedback components.

In one aspect, a first feedback component is configured to provide first tactile feedback based on a first control signal and a second feedback component is configured to provide no tactile feedback at a first instance of time to indicate a first direction in which the user may travel towards the object.

In another aspect, a first feedback component may be disposed on a first side of the handle and a second feedback component may be disposed on a second side of the handle.

In yet another aspect, an array of three or more feedback components is used to provide tactile feedback.

Still, in yet another aspect, a plurality of feedback components may be configured to sequentially provide tactile feedback—e.g., so as to indicate a direction of rotation in which the user may rotate in order to align the user along a path to the object, or to align a user along the object itself. In one example, the tactile feedback indicates a clockwise direction of rotation about a vertical "z" axis of a user when the tactile feedback includes tactile feedback from a first feedback component at a first instance of time, tactile feedback from a second feedback component at a second instance of time after the first instance of time, and tactile feedback from a third feedback component at a third instance of time after the second instance of time. Clockwise rotation could alternatively be indicated by activating only the right feedback component where only two feedback components are used.

In yet another aspect, the tactile feedback may indicate a direction in which the user may travel towards the object, an amount of distance between the user and the object, and/or a depth of the object below a surface.

In accordance with yet another aspect, tactile feedback indicating a direction may include tactile feedback from a first feedback component and no tactile feedback from a second feedback component, and tactile feedback indicating an amount of distance may be modulated so as to provide more frequent tactile feedback as the amount of distance decreases over a time period.

In yet another aspect, a locator module may determine the position information based on magnetic fields related to the buried object, GPS location technologies, cellular location technologies, LAN location technologies, mapping technologies, and other technologies for determining locations of objects.

In yet another aspect, a plurality of feedback components may be configured to provide audio feedback based on the position information relating to the location of the object and further based on a location and orientation of the user relative to the location of the objects.

Finally, in yet another aspect, tactile feedback may be based on information relating to an obstacle or hazard in the same environment as the object.

Various additional aspects, details, features, and functions are described below in conjunction with the appended Drawing figures.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1:
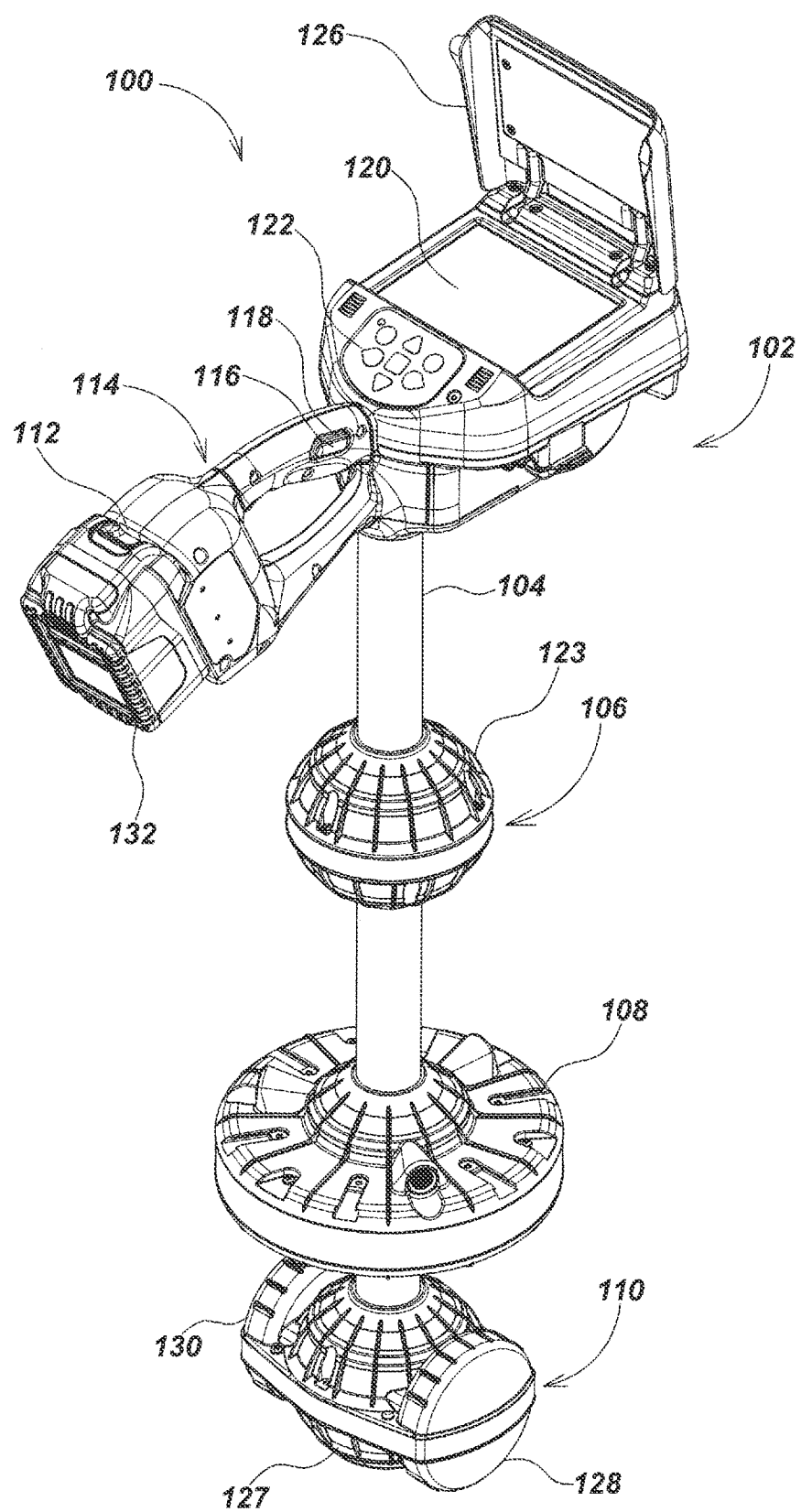
FIG. 1 is an isometric view of an embodiment of a locating system.

This disclosure relates generally to one or more locating systems and related accessories, apparatus, methods, and computer program products comprising computer usable medium having a computer readable program code embodied therein that is adapted to be executed for directional navigation in various environments based on sensory feedback, including tactile and/or auditory feedback. More specifically, but not exclusively, this disclosure relates to a utility locating system for locating buried objects, the system including a haptic interface for providing tactile directional and/or location information associated with the buried object to a user.

Battery devices and related components as may be used with various embodiments are described in co-assigned patent applications including U.S. Provisional Patent Application Ser. No. 61/501,172, entitled MODULAR BATTERY PACK APPARATUS, SYSTEMS, AND METHODS, filed Jun. 24, 2011, and U.S. Patent Application Ser. No. 61/521,262, entitled MODULAR BATTERY PACK APPARATUS, SYSTEMS, AND METHODS, filed Aug. 8, 2011. The content of each of these applications is incorporated by reference herein in its entirety.

Various additional aspects and details of buried object locator device elements, apparatus, systems, and methods which may be used in embodiments in conjunction with the various aspects disclosed herein are described in co-assigned patent applications including U.S. patent application Ser. No. 13/214,208, entitled ASYMMETRIC DRAG FORCE BEARINGS FOR USE WITH PUSH-CABLE STORAGE DRUMS, filed Aug. 21, 2011, U.S. patent application Ser. No.

12/704,808, entitled PIPE INSPECTION SYSTEM WITH REPLACEABLE CABLE STORAGE DRUM, filed Feb. 12, 2010, U.S. patent application Ser. No. 12/399,859, entitled PIPE INSPECTION SYSTEM WITH REPLACEABLE CABLE STORAGE DRUM, filed Mar. 6, 2009, U.S. patent application Ser. No. 12/371,540, entitled PUSH-CABLE FOR PIPE INSPECTION SYSTEM, filed Feb. 13, 2009, and U.S. Provisional Patent Application Ser. No. 61/152,662, entitled HIGH PERFORMANCE PIPE INSPECTION SYSTEM, filed Feb. 13, 2009. The content of each of these applications is incorporated by reference herein in its entirety.

Various other aspects and details of buried object locator device elements, apparatus, systems, and methods which may be used in embodiments in conjunction with the various aspects disclosed herein are described in co-assigned patent applications including U.S. patent application Ser. No. 13/469,024, entitled BURIED OBJECT LOCATOR APPARATUS AND SYSTEMS, filed May 10, 2012, U.S. patent application Ser. No. 12/939,591, entitled SMART PERSONAL COMMUNICATION DEVICES AS USER INTERFACES, filed Nov. 4, 2010, U.S. patent application Ser. No. 12/947,503, entitled IMAGE-BASED MAPPING LOCATING SYSTEM, filed Nov. 16, 2010, U.S. patent application Ser. No. 13/041,320, entitled ECONOMICAL MAGNETIC LOCATOR APPARATUS AND METHOD, filed Mar. 4, 2011, U.S. patent application Ser. No. 13/161,183, entitled GROUND-TRACKING DEVICES FOR USE WITH A MAPPING LOCATOR, filed Jun. 15, 2011, U.S. Provisional Patent Application Ser. No. 61/559,696, entitled QUAD-GRADIENT COILS FOR USE IN LOCATING SYSTEMS, filed Nov. 14, 2011, U.S. Provisional Patent Application Ser. No. 61/614,829, entitled QUAD-GRADIENT COILS FOR USE IN LOCATING SYSTEMS, filed Mar. 23, 2012, U.S. Provisional Patent Application Ser. No. 61/561,809, entitled MULTI-FREQUENCY LOCATING SYSTEMS & METHODS, filed Nov. 18, 2011, U.S. Provisional Patent Application Ser. No. 61/599,404, entitled SMART PAINT STICK DEVICES AND METHODS, filed Feb. 15, 2012, U.S. Provisional Patent Application Ser. No. 61/615,810, entitled GROUND-TRACKING SYSTEMS AND APPARATUS, filed Mar. 26, 2012, U.S. Provisional Patent Application Ser. No. 61/607,510, entitled DUAL SENSED LOCATING SYSTEMS & METHODS, filed Mar. 6, 2012, U.S. Provisional Patent Application Ser. No. 61/679,672, entitled OPTICAL GROUND TRACKING APPARATUS, SYSTEMS, & METHODS, filed Aug. 3, 2012, U.S. Provisional Patent Application Ser. No. 61/521,362, entitled PHASE SYNCHRONIZED BURIED OBJECT LOCATOR APPARATUS, SYSTEMS, AND METHODS, filed Aug. 8, 2011, U.S. Provisional Patent Application Ser. No. 61/619,327, entitled OPTICAL GROUND TRACKING LOCATOR DEVICES & METHODS, filed Apr. 2, 2012, U.S. Provisional Patent Application Ser. No. 61/598,312, entitled OPTICAL GROUND TRACKING LOCATOR DEVICES & METHODS, filed Feb. 13, 2012, and U.S. Provisional Patent Application Ser. No. 61/531,598, entitled SYSTEMS AND METHODS FOR LOCATING BURIED OR HIDDEN OBJECTS USING SHEET CURRENT FLOW MODELS, filed Sep. 6, 2011. The content of each of these applications is incorporated by reference herein in its entirety.

Certain aspects of the invention relate to directional navigation for users within various environments, including, among others, urban environments that pose various hazards, including vehicular traffic and structural obstacles. Such directional navigation may use feedback, including tactile feedback and/or other feedback (e.g., auditory, visual, smell, and taste feedback). For the sake of simplicity, discussion of feedback herein is generally limited to tactile feedback. Such feedback may be delivered to a user's sensory receptor via various means.

For example, means for delivering tactile feedback may include feedback components (e.g., mechanical transducers, acoustic transducers, thermal transducers, or other signaling component) in a handle or other structure/item (e.g., vest, belt, pocket insert, glove, waist band, wristband, watch, ankle band, sock, headband, hat, shoulder pad, portable computing device like a smart phone, etc.) that contacts a user's hand or other body part (e.g., waist, ankle, wrist, head, neck, hip, torso, etc.). A handle, for example, may include one or more isolated paths that each delivers separate tactile feedback. Attachments with one or more isolated paths that couple to existing handles or other components are also contemplated. Feedback may be controlled using wired or wireless means (e.g., known wireless communication protocols from a locator, a smart phone, or other processing system).

Tactile feedback, for example, may be used to indicate various characteristics of an object, including location information specifying an estimated location of the object relative to the location of a locator/user operating the locator. Such location information may include an estimated distance between the object and the user, an optimal direction of travel the user may take to reach the object (e.g., including a direction of travel or directions of travel over time that avoid environmental hazards), a depth of the object below the ground, and an orientation of the user with respect to the orientation of the object (e.g., a long pipe) or with respect to a direction of travel.

Providing tactile feedback, for example, enables a user to rely on his or her tactile senses to determine location information related to an object while reserving other senses (e.g., sight, sound, etc.) to monitor environmental conditions like traffic. One of skill in the art will appreciate that the tactile feedback could instead be used to provide information about those environmental conditions so the user could rely on those other senses (e.g., sight, sound, etc.) for locating the buried object or reviewing location information about that buried object. For example, tactile feedback may be provided to alert the user of nearby traffic, obstructions, and/or potential tripping hazards.

Of course, different combinations of feedback may be used to convey different combinations of environmental conditions and location information while permitting the user to rely on any other sense for perceiving any remaining conditions. For example, tactile feedback may provide location information, and auditory feedback may alert the user to some hazards, while the user's vision may be relied upon to identify other hazards. It is further contemplated that single or multiple feedback paths may convey information related to both location information specific to an objection and environmental conditions. For example, feedback that conveys both location information and environmental conditions may include an optimal direction of travel so the user can reach the location of the object while avoiding certain environmental hazards (e.g., fences, moving vehicular traffic, or other environmental features that limit movement).

Certain aspects of the invention relate to a haptic handle for use in a buried object locator including an input module configured to receive information associated with a buried object, and an output module configured to provide tactile feedback as a haptic tactile output signal based on the received information. The buried object locator may further include a locator module configured to determine location information associated with the buried object. One or more methods for locating buried objects by determining location information associated with the buried object and providing haptic signaling based on the determined location information are also contemplated.

Still other aspects of the invention relate to a buried object locator that may include, for example, a locator module configured to determine location and/or position information associated with a buried object and a haptic handle apparatus coupled to the locator. The haptic handle may include one or more tactile feedback components. The one or more tactile feedback components may be configured to provide tactile feedback associated with a relative position and/or location of the buried object based at least in part on the determined location and/or position information. The location and/or position information may be determined relative to a position of the locator. The location and/or position information may be determined in multiple dimensional axes, such as two or three dimensions.

The tactile feedback associated with the relative position and/or location may, for example, be generated to provide feedback directing a user to a position or location of the buried object relative to the buried object locator. The tactile feedback associated with the relative position and/or location may be further generated to provide directional feedback based on a relative distance from the buried object locator to the buried object. The tactile feedback associated with the relative position and/or location may further be generated to provide directional feedback based on a relative depth of the buried object below the ground or other surface, or relative to a height or distance of the buried object locator above the ground or other surface.

The haptic handle may further include, for example, one or more switches configured to receive user switching inputs. The one or more switches may be disposed in proximity to the one or more tactile feedback components or may be disposed elsewhere on or in the buried object locator. The one or more switches may be disposed integrally with one or more of the tactile feedback components. The one or more switches may include a pair of switches disposed in substantially opposition ends of ones of the tactile feedback components. The one or more switches may include a pair of switches disposed on opposition sides or ends of the haptic handle.

The one or more tactile feedback components may include, for example, a vibrational electric motor, a piezoelectric element, an electromagnetic vibrational element such as an audio speaker, and/or other components or devices capable of generating vibrational or touch-sensitive feedback to a user.

The one or more tactile feedback components may include, for example, an array of tactile feedback components disposed on the haptic handle. The array may be an array of three or more tactile feedback components. The three or more tactile feedback components may be arrayed in a grid pattern on the handle. Feedback provided by the array may be generated on the array to correspond with a direction, position, distance, and/or depth to the buried object. Feedback provided by the array may be further generated to provide tactilely distinct feedback for two or more located buried objects. The tactilely distinct feedback may be generated simultaneously.

The locator may further include, for example, a processing element to receive and process locator signals and/or generate output signals such as tactile feedback control signals. The processing element may be configured to receive one or more input signals from the locator module corresponding to the determined location and/or position information, and generate, based at least in part on the received location information, tactile feedback control signals for use in providing the tactile feedback from the tactile feedback components. The processing element may further include or be coupled to a tactile feedback control/driver circuit to control output from the tactile feedback components.

Alternative processing elements are also contemplated, including processing elements in computing devices (e.g., portable computing devices like smart phones and laptops). Such computing devices may couple to one or more channels of a locator (e.g., via wired or wireless connections) to receive position information from the locator, or transmit commands to feedback components at the locator (e.g., in the locator's handle). These computing devices may also receive, through various wired and wireless connections known in the art, additional information from other sources (e.g., backend servers and/or databases that store information regarding the location of the object or environmental conditions, or local area networks/transmissions from nearby hazards like cars and buildings), and may use that additional position information to control feedback components.

Use of computing devices like smart phones as additional or alternative processing elements permits a user to use a legacy locator for obtaining location information, where feedback components may be coupled to or separated from that legacy locator to deliver feedback using that location information. Furthermore, use of such computing devices permits centralized control of various feedback components (e.g., tactile feedback components at a locator, and auditory feedback components near a user), and also enables use of computer applications that are otherwise not available at the locator.

Tactile feedback components may include, for example, a pair of tactile feedback components, and the tactile feedback control signals may correspond to a right and/or left direction and/or distance and/or depth of the buried object relative to a location of the buried object locator. The tactile feedback control signals may be generated to provide tactile feedback corresponding to a relative degree and/or amount of right or left offset and/or distance of the locator from the buried object. The tactile feedback control signals may be generated to provide amplitude modulated tactile feedback. The amplitude modulated tactile feedback may be provided in proportion to the relative degree or amount of right or left offset and/or distance. The amplitude modulated tactile feedback may be provided in proportion to a depth to the buried object. The tactile feedback control signals may be generated to provide time modulated tactile feedback in proportion to the relative degree or amount of right or left offset and/or distance. The tactile feedback control signals may be generated to provide frequency modulated tactile feedback in proportion to the relative degree or amount of right or left offset and/or distance and/or depth. The tactile feedback control signals may be generated to provide two or more of time modulation, amplitude modulation, and frequency modulation tactile feedback corresponding to relative degree or amount of right or left offset and/or distance and/or depth.

Certain aspects of the invention relate to a method for locating a buried object. The method may include, for example, determining, in a locator module, location and/or position information associated with the buried object. The method may further include providing a haptic tactile feedback output associated with a relative position and/or location of the buried object from one or more tactile feedback components, wherein the feedback output is based at least in part on the determined location information. The method may further include, for example, receiving a switching input from a switch disposed in proximity to one of the tactile feedback components, and generating a control signal in the locator based on the received switching input.

The one or more tactile feedback components may include a pair of tactile feedback components, and the method may further include generating tactile feedback control signals in a processing element. The tactile feedback control signals may correspond to a right and/or left direction and/or distance of the buried object relative to a location of the buried object locator. The right and/or left direction or distance signals may correspond to a relative degree and/or amount of right or left offset and/or distance of the locator from the buried object and/or a depth to the buried object. The tactile feedback control signals may be generated to provide amplitude modulated tactile feedback. The amplitude modulated tactile feedback may be in proportion to the right or left offset and/or distance and/or depth of the buried object. The tactile feedback control signals may be generated to provide time modulated tactile feedback in proportion to the right or left offset and/or distance and/or depth. The tactile feedback control signals may be generated to provide frequency modulated tactile feedback in proportion to the right or left offset and/or distance and/or depth. The tactile feedback control signals may be generated to provide two or more of time modulated, amplitude modulated, and frequency modulated tactile feedback. The feedback may correspond to the right or left offset and/or distance and/or depth to the buried object.

The method may alternatively or additionally determine, in a locator module, location and/or position information associated with the buried object. The method may further provide a haptic tactile feedback output associated with a relative position and/or location and/or depth of the buried object from one or more tactile feedback components. The feedback output may be based at least in part on the determined location information.

Certain aspects of the invention relate to a computer readable medium. The computer readable medium may include, for example, instructions for causing a computer or other processor-implemented device to receive, from a locator module, location and/or position information associated with a buried object and generate, based at least in part on the location and/or position information, tactile feedback control signals associated with a relative position and/or location of the buried object. The instructions may further include instructions to provide the tactile feedback control signals to one or more tactile feedback components disposed in a haptic handle.

The medium may further include instructions, for example, for receiving one or more switch inputs from one or more of a plurality of switches located in proximity to the tactile feedback component, and providing a control signal based at least in part on the one or more switch inputs. The tactile feedback control signals may be generated to control tactile feedback output of a vibrational motor. The tactile feedback control signals may be generated to control tactile feedback output of a piezoelectric element. The tactile feedback control signals may be generated to control tactile feedback output of an electromagnetic vibrational element.

The tactile feedback components may include, for example, a pair of tactile feedback components, and the tactile feedback control signals may correspond to a right and/or left direction and/or distance of the buried object relative to a location of the buried object locator. The tactile feedback control signals may be generated to provide tactile feedback corresponding to a relative degree of right or left offset and/or distance and/or depth of the locator from the buried object. The tactile feedback control signals may be generated to provide amplitude modulated tactile feedback in proportion to the right or left offset and/or distance and/or depth. The tactile feedback control signals may be generated to provide time modulated tactile feedback in proportion to the right or left offset and/or distance and/or depth. The tactile feedback control signals may be generated to provide frequency modulated tactile feedback in proportion to the right or left offset and/or distance and/or depth. The tactile feedback control signals may be generated to provide two or more of time modulation, amplitude modulation, and frequency modulation tactile feedback corresponding to the right or left offset and/or distance and/or depth.

Certain aspects of the invention relate to an apparatus for use in a haptic device. The apparatus may include, for example, an input module configured to receive information associated with a location of a target. The apparatus may further include a processing module, including a processing element, coupled to the input module to receive and process the location information. The apparatus may further include an output module coupled to the processing module, the output module configured to receive an output tactile control signal from the processing module and generate a tactile feedback output based at least in part on the received location information.

The haptic device may be, for example, a buried object locator and the target may be a buried object or otherwise hidden or inaccessible object, such as a pipe, cable, conduit, cavity, or other object. The input module may be configured to receive the location information from a buried object locator module of a buried object locator. The output module may be configured to generate the tactile feedback output to correspond with an angle and/or direction of the buried object relative to a position of the buried object locator. The tactile feedback may correspond to a relative offset to the left or right of the target with reference to the buried object locator.

Various aspects of the disclosure relate to systems, apparatus, means, methods, and computer readable medium for providing information to a user about the relative location of a buried object using tactile feedback using any of the features described herein or variations understandable to one of skill in the art. Various additional aspects, details, features, and functions are described below in conjunction with the appended Drawings.

Example Embodiments

Referring to FIG. 1, an embodiment of a locating system 100 in accordance with certain aspects is illustrated. The locating system 100 may include a locator body 102, which may be disposed on the upper end of a locator mast 104. An upper antenna node 106, a middle antenna node 108, and a lower antenna node 110 may be disposed vertically along the mast 104. The locator body 102 may include a battery dock 112 formed into one end, and a central locator handle assembly 114. A right touch face 116 may be molded into the handle assembly 114 with a right overmold 118. The right touch face 116 may be disposed on the outer surface of a hard molded capsule of ABS or similar material which may be inserted into the locator body 102 and overmolded to the handle. A locator display screen 120 and a locator keypad 122 may be operably attached at the other end of the handle assembly 114.

A display screen cover 126 may optionally include a sensor (not shown) for detecting the position of the display screen cover 126, such as for example, open (unfolded) or closed. In order to conserve battery power, the sensor may turn off certain functionality of the locating system 100, such as for example, when it detects that the display screen cover 126 is in a closed position. Upper antenna node 106 may include an omnidirectional antenna disposed within a central housing 123. Lower antenna node 110 may include an omnidirectional antenna array disposed within a central housing 127, which may be disposed between an internal right gradient antenna (not shown) disposed within housing 128 and an internal left gradient antenna (not shown) disposed within a housing 130.

Still referring to FIG. 1, a rechargeable battery, such as a lucid battery 132, may be disposed at the end of handle assembly 114 for providing power to the locating system 100. Lucid battery 132 and a corresponding receiver and/or shoe module (not shown in FIG. 1) may be constructed in accordance with embodiments described in U.S. Patent Application Ser. No. 61/501,172, filed Jun. 24, 2011, entitled MODULAR BATTERY PACK APPARATUS, SYSTEMS, AND METHODS; and U.S. Patent Application Ser. No. 61/521,262, filed Aug. 8, 2011, entitled MODULAR BATTERY PACK APPARATUS, SYSTEMS, AND METHODS the entire contents of which is incorporated by reference herein. For example, locator body 102 may be configured with a battery pack system, which may include a battery receiver 202 (not shown in FIG. 1) mated with a rechargeable battery pack, such as battery pack 132 to provide power to the locating system 100. The battery receiver 202 may be mounted to battery dock 112 for providing electrical connection and latching. Signals from the right gradient antenna 128 and left gradient antenna 130 may be processed by computational circuits disposed within the locator body 102 and compared to the computed center of the buried conductor as detected by the upper omnidirectional antenna array 123 and the lower omnidirectional antenna array 127.

Figure 15:
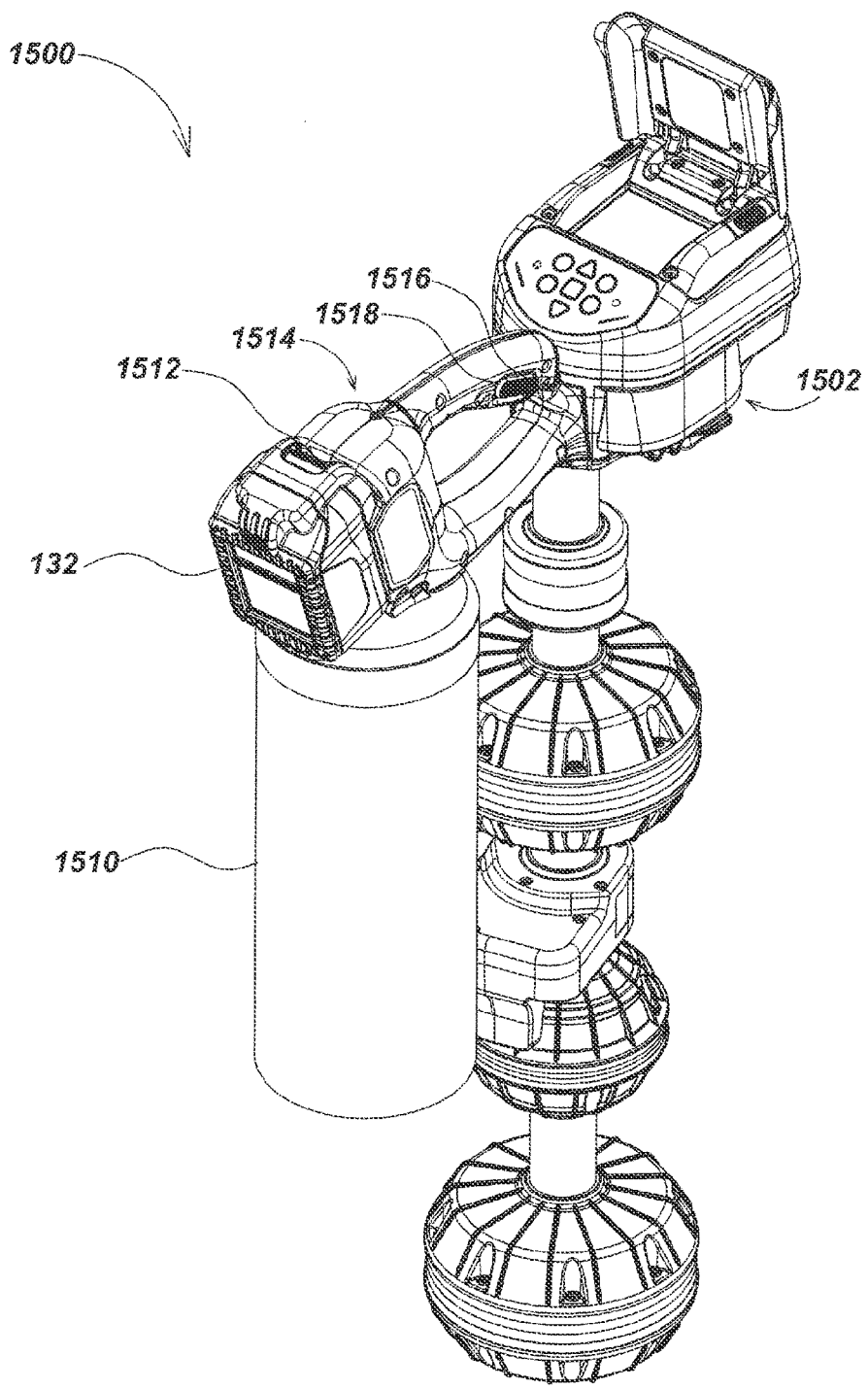
FIG. 15 is an isometric view of an alternative embodiment of a locating system.

Similarly, FIG. 15 depicts certain aspects of an embodiment of a locating system 1500 in accordance with certain aspects. The locating system 1500 may include a locator body 1502. The locator body 1502 may include a battery dock 1512 formed into one end, and a central locator handle assembly 1514. A right touch face 1516 may be molded into the handle assembly 1514 with a right overmold 1518. The right touch face 1516 may be disposed on the outer surface of a hard molded capsule of ABS or similar material which may be inserted into the locator body 1502 and overmolded to the handle. A rechargeable battery, such as a lucid battery 132, may be disposed at the end of handle assembly 1514 for providing power to the locating system 1500. An optical ground tracking component 1510 is also included in the locating system 1500, and may be connected via a USB interface (not shown in FIG. 15).

Various aspects and details of the optical ground tracking component 1510 and methods of its use which may be used in embodiments in conjunction with the various aspects disclosed herein are described in co-assigned patent applications including U.S. Patent Application Ser. No. 61/598,312, entitled OPTICAL GROUND TRACKING LOCATOR DEVICES AND METHODS, filed Feb. 13, 2012, U.S. Patent Application Serial No. 61/619,327, entitled OPTICAL GROUND TRACKING LOCATOR DEVICES AND METHODS, filed Apr. 2, 2012, and U.S. Patent Application Ser. No. 61/679,672, entitled OPTICAL GROUND TRACKING APPARATUS, SYSTEMS, & METHODS, filed Aug. 3, 2012. The content of each of these applications is incorporated by reference herein in its entirety.

Figure 2:
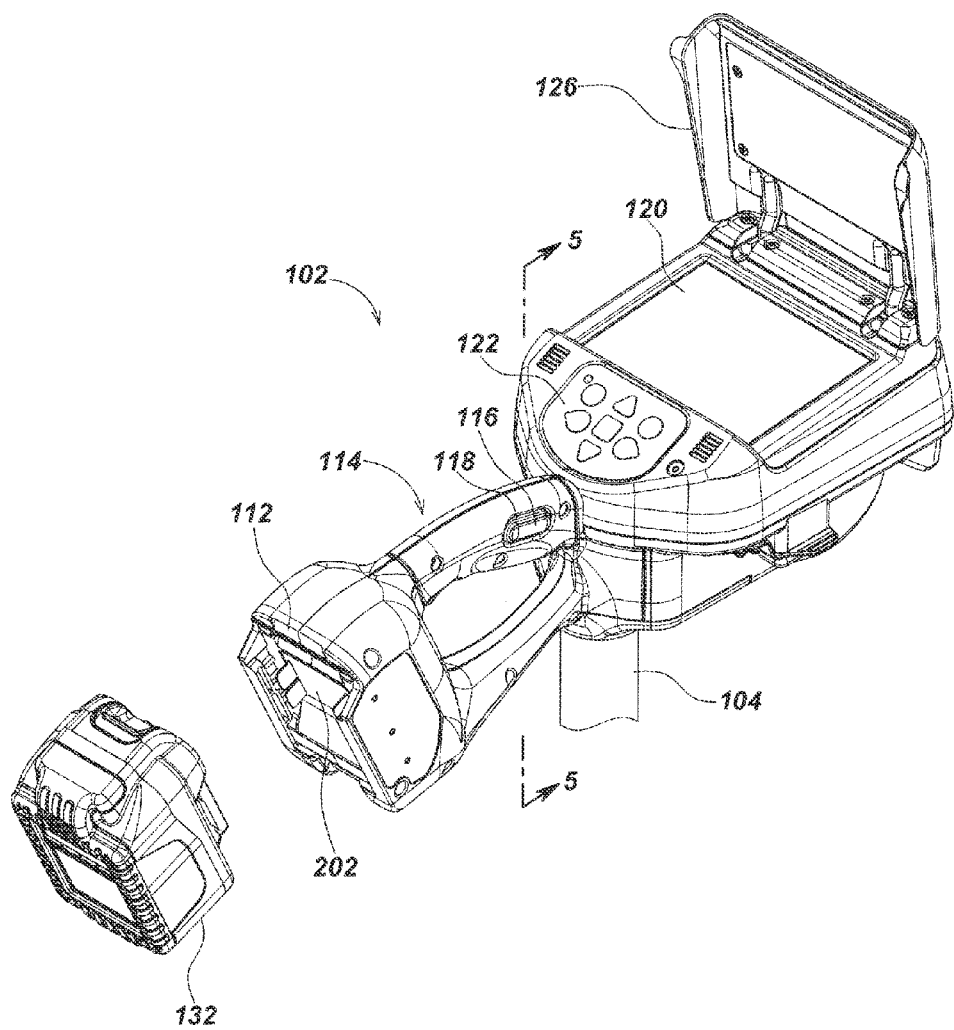
FIG. 2 is an enlarged partially exploded view of a locator body of FIG. 1, illustrating details of a handle assembly.

Referring to FIG. 2, an enlarged partially exploded view of locator body 102 illustrates additional details of the handle assembly 114. For example, lucid battery pack 132 is removed from handle assembly 114 to illustrate how the pack 132 mates with the battery receiver 202.

A right touch face 116 may be molded into the handle assembly 114 with a right overmold 118. The right overmold 118 may be formed using various materials, including any suitable elastomers. The right touch face 116 may be the outer surface of a formed capsule which encloses a vibrating element, details of which may be discussed in FIGS. 3-5.

Figure 3:
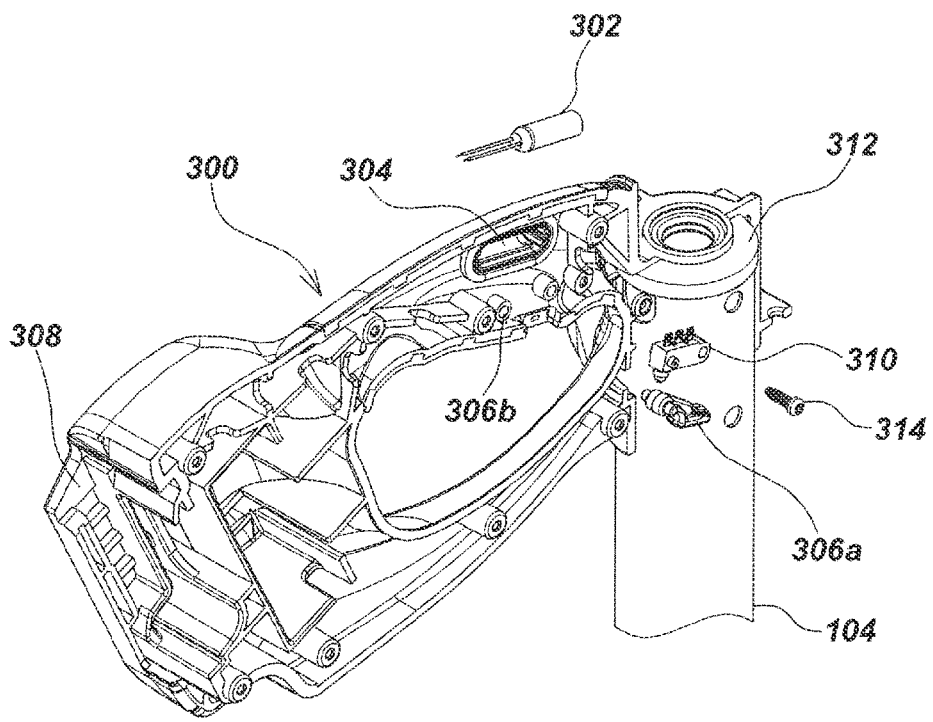
FIG. 3 is an exploded and cutaway view of an embodiment of a haptic handle assembly of FIGS. 1-2, illustrating details thereof.

Turning to FIG. 3, details of a left handle side embodiment 300 is illustrated. Left handle side 300 may correspond to one of two of the molded halves which may be joined to form the handle assembly 114 (FIGS. 1-2). One or more vibrating elements, such as a left vibrating element 302, may be disposed within the housing of handle assembly 114 (FIGS. 1-2). In an exemplary embodiment, a left containing capsule 304 may be, for example, overmolded into the left handle side 300, and retain the left vibrating element 302. The outer surface of the left containing capsule 304 may provide a left touch face (not shown in FIG. 3) similar to the right touch face 116 (FIGS. 1-2). A trigger 306*a* is moved away from a pivot attachment 306*b*, for purposes of illustration. The trigger 306*a* activates a micro switch 310 and may be used by the operator to initialize an electronic marking data point at locations of interest, or for other control functions and operator indications. The micro switch 310 may be retained by a screw 314.

Figure 4:
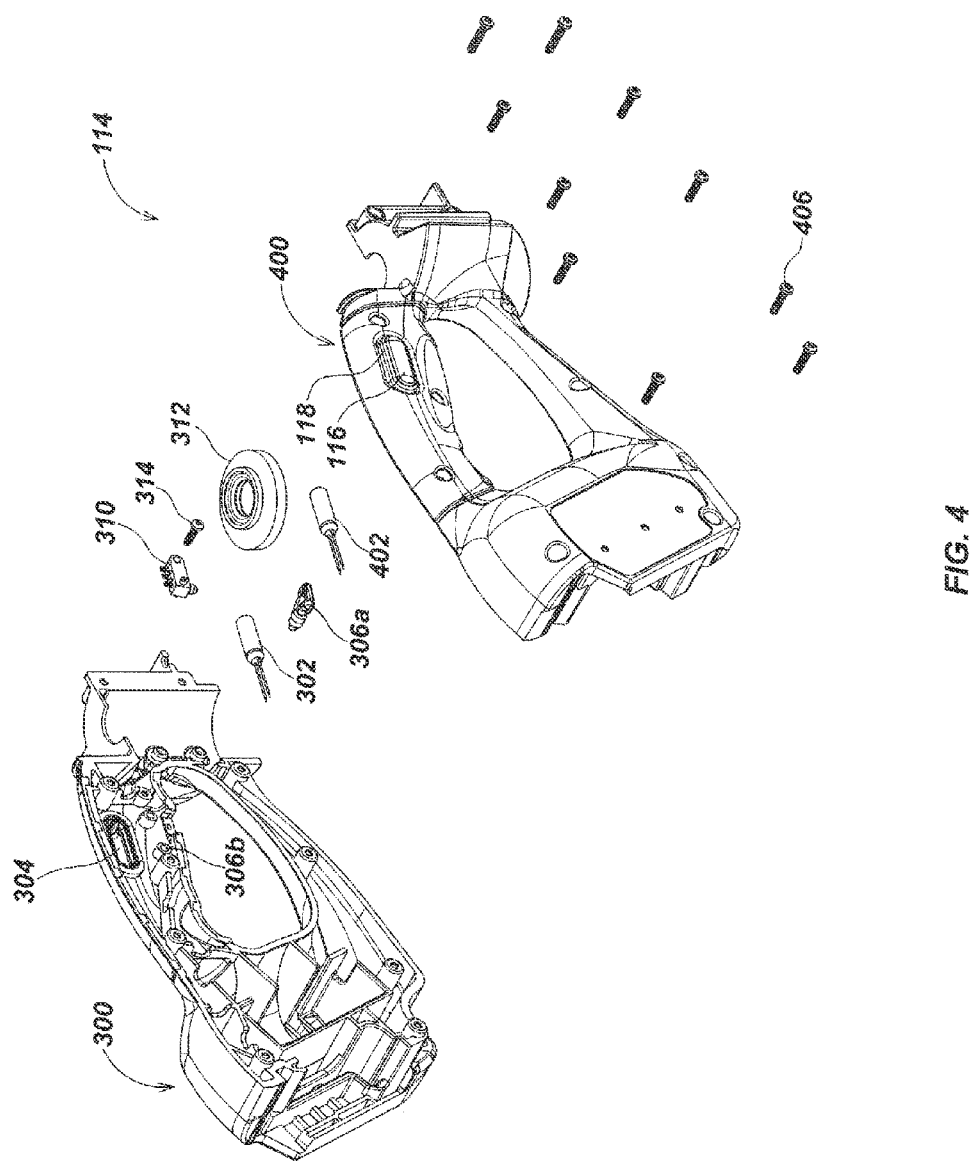
FIG. 4 is an exploded view of the haptic handle assembly embodiment of FIGS. 1-3.

Still referring to FIG. 3, a battery dock section 308 may form the complete battery dock 112 (FIGS. 1-2) when the left handle side 300 mates with a corresponding right handle side 400 (FIG. 4). A sealing element, such as cap seal 312, may be used to seal the mast 104 (FIGS. 1-2) where it joins the locator body 102 (FIGS. 1 and 2).

FIG. 4 is an exploded view of the haptic handle assembly embodiment 114 of FIGS. 1 and 2, illustrating details thereof. The left handle side 300 and a right handle side 400 may be mated to form the housing of haptic handle assembly 114. In an exemplary embodiment, the left vibrating element 302 and a right vibrating element 402 may be individually snap-fit into the left containing capsule 304 and a right containing capsule 502 (not shown in FIG. 4), respectively. The left containing capsule 304 may be overmolded into the left handle side 300 and the right containing capsule (502 in FIG. 5) may be overmolded into the right handle side 400. The outer surface of the left containing capsule 304 may provide the left touch face (not shown in FIG. 4), while the outer surface of the right containing capsule 404 provides the right touch face 116. One or more fasteners, such as screws 406 may be used to assemble the left handle side 300 and the right handle side 400.

The left vibrating element 302 and the right vibrating element 402 may be, for example, magnetically driven micro vibration motors, such as the Z6DL2B0055211 3.0-volt device available from Jin Long Machinery of 640 Dean Street, Brooklyn, N.Y., 11238, or a similar device. In an exemplary embodiment, the vibrating element may have a vibration rate of ~11000 rpm with a shaft endplay of between 0.1 and 0.3 mm.

The left vibrating element 302 (FIG. 3) and the right vibrating element 402 may oscillate in defined bursts, sequences, etc., to indicate the direction desired to approach the computed center of the target buried conductor. The haptic signals provided by elements 302 and 402 may optionally be provided in various durations, which may depend on the distance to a computed center, or may be timed at selected intervals. For example, the vibrating elements may provide less frequent haptic signals to indicate greater distance from the computed center as compared to more frequent signals for distances that are closer to the computed center. The vibrating elements may be otherwise configured to optimize the haptic signals as an effective communication to aid the locator operator in his task.

Other vibration elements (not shown in FIG. 4) may be disposed in or on the haptic handle assembly 114 to provide additional haptic signals. For example, vibration elements may be disposed on the top of the handle assembly 114, at or near the trigger 306a, and/or near the vibration elements 302 and 402 along the left handle side 300 and right handle side 400, respectively. One or more vibration elements may be used to provide different information to the locator operator using haptic signals. For example, haptic signals may provide a direction of rotation needed so as to align the locator operator with the direction of the buried target once the operator is positioned above the center of the buried target.

In one aspect, the left vibrating element 302 and right vibrating element 402 may be separated to provide directional isolation of the signals. For example, left vibrating element 302 and right vibrating element 402 may each be disposed in a separate housing, such as left handle side 300 and right handle side 400, respectively. The individual touch areas may be coupled to the senses of the hand to provide discrete directional haptic signals. The overmolds connecting the capsules to the other parts of the handle sides of the handle assembly 114 may minimize and/or eliminate noticeable vibrations at all parts of the handle assembly 114 (with the exception of the touch areas of the capsules).

Figure 5:
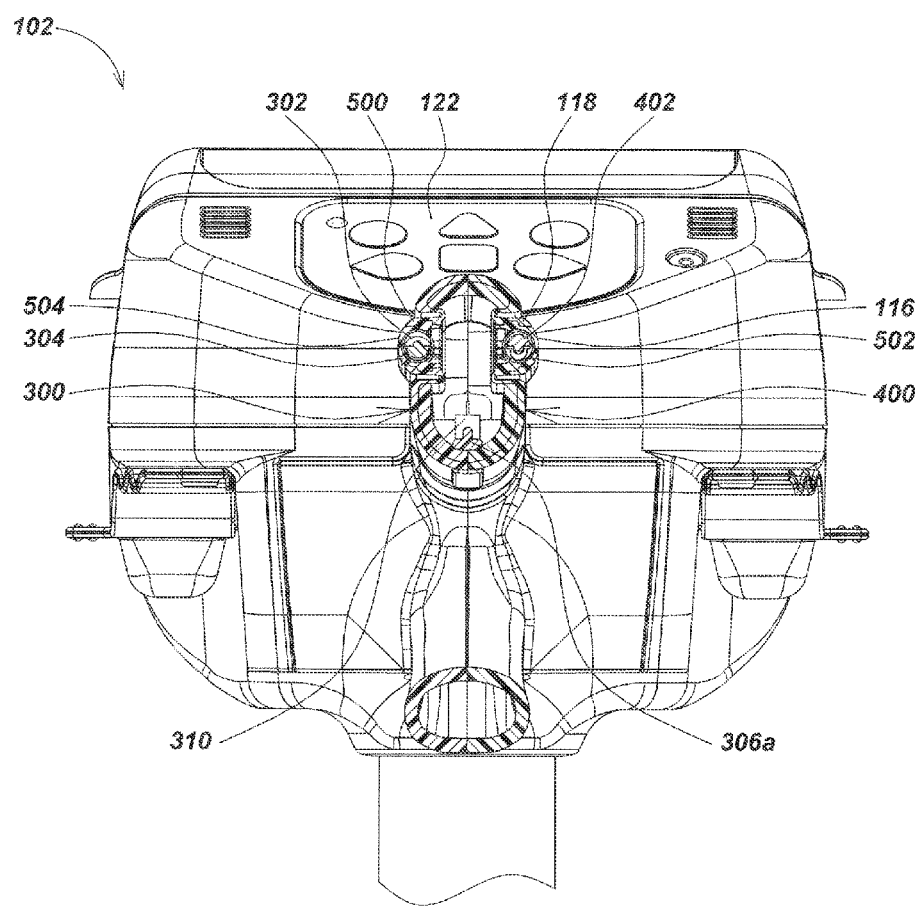
FIG. 5 is a section view of the locator body embodiment of FIGS. 1 and 2, taken along line 5-5.

Turning to FIG. 5, a section view of the locator body embodiment 102 of FIGS. 1 and 2, taken from line 5-5, illustrates details. For example, the left vibrating element 302 may be disposed in the left containing capsule 304 and the right vibrating element 402 may be disposed in a right containing capsule 502. The left containing capsule 304 and the right containing capsule 502 may be overmolded into their respective handle sides, and each may include a vibrating element which may be snap-fit into the containing capsule. The right side of right touch face overmold 118 and the left side of a left touch face overmold 500 integrate the right containing capsule 502 and the left containing capsule 304 into the right handle side 400 and the left handle side 300, respectively. The external faces of the left containing capsule 304 and the right containing capsule 502 may provide a left touch face 504 and right touch face 116, respectively.

The locator handle assembly 114 may include trigger 306a, anchored by the trigger pivot attachment 306b (not shown), which may be centrally located on the underside of the handle's grip, such as, for example, where the operator's fingers may detect a signal. Pressing the trigger 306a may activate the micro switch 310 and may generate an electronic signal used to establish an electronic position mark at a location of interest. Such position marks may be electronically stored in the locator's on-board memory and combined with GPS positional information, for example, in generating mapping images of the locate process or returning to a previously identified location.

Figure 6:
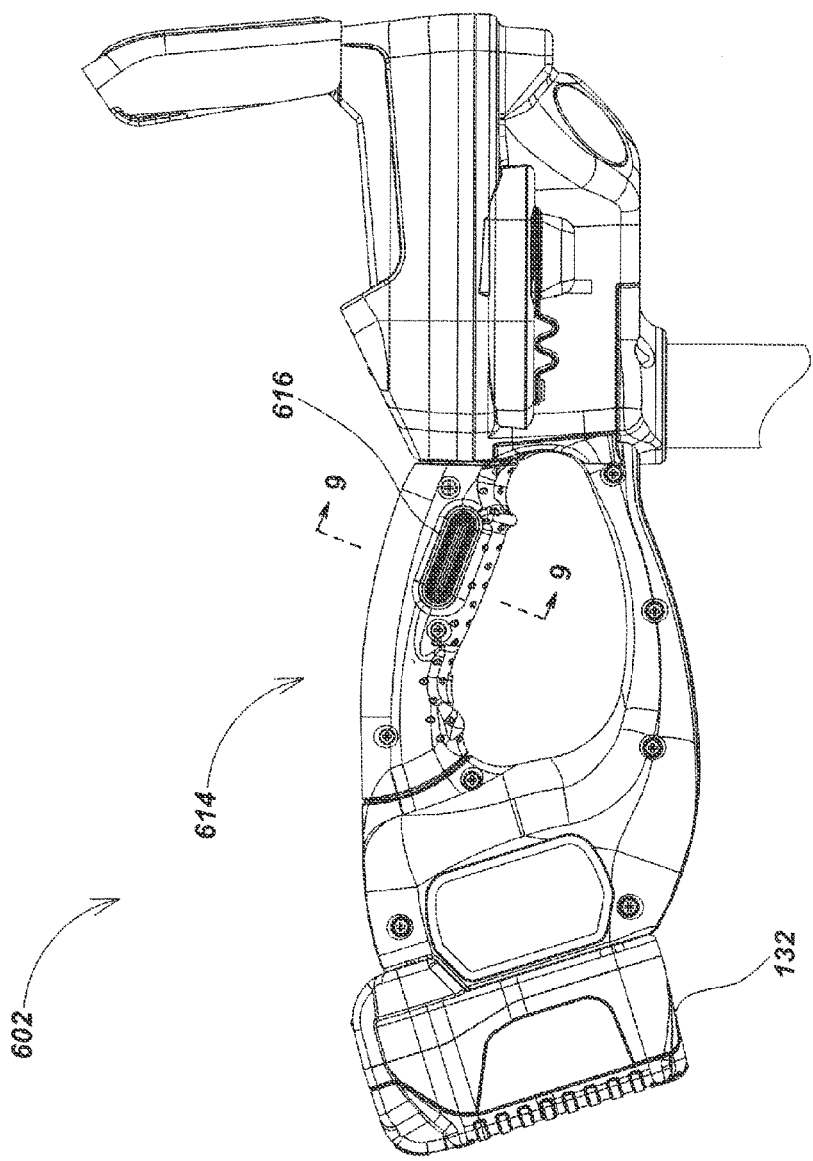
FIG. 6 is an enlarged perspective view of an alternate embodiment locator body.

FIG. 6 is an enlarged perspective view of an alternate embodiment locator body 602. Locator body 602 may be configured with various elements, such as the elements described in FIGS. 1 and 2). For example, locator body may be configured with a rechargeable battery pack, such as battery pack 132 (FIGS. 1 and 2) to provide power to a locating system, such as, for example, locating system 100. Locator body 602 may include an alternate handle assembly embodiment 614 and a touch pad 616, which may be disposed on the surface of handle assembly embodiment 614, to provide an interface between the operator and locator system 100.

Figure 16:
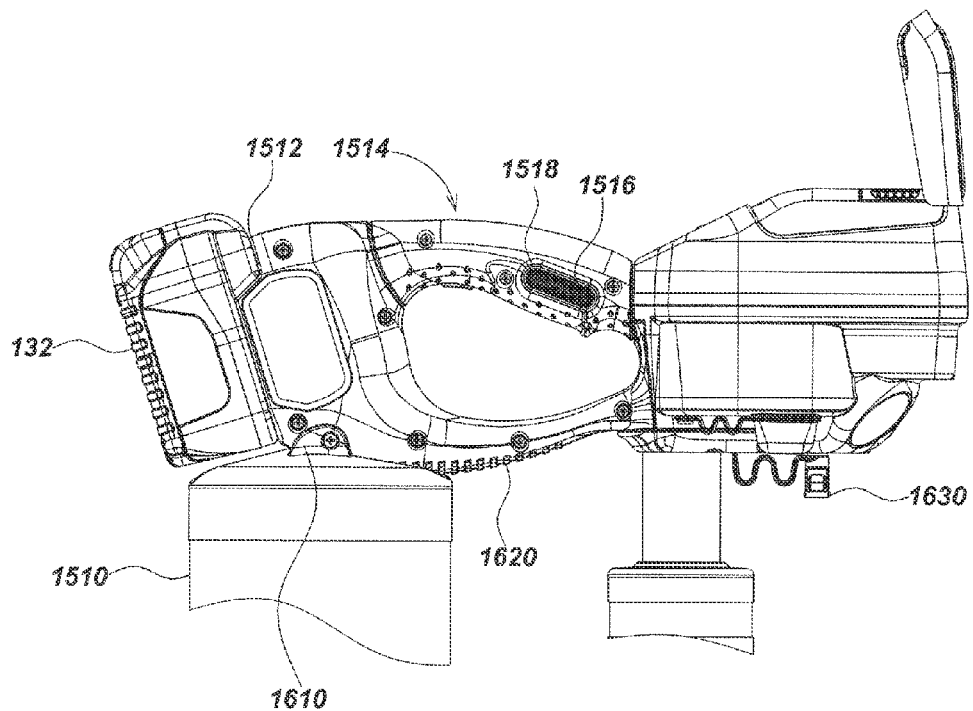
FIG. 16 is an enlarged perspective view of an alternate embodiment locator body.

Similarly, FIG. 16 is an enlarged perspective view of an embodiment of a locator body associated with the locating system 1500 of FIG. 15. As shown, FIG. 16 depicts the battery pack 132 to provide power to a locating system (e.g., locating system 1500), the optical ground tracker component 1510, the battery dock 1512, the handle assembly 1514, the touch face 1516, and the overmold 1518. Also shown are a mounting ear 1610 for the optical ground tracker component 1510, anti-skid overmolded cleats 1620, and an access port cover 1630 (e.g., a phono socket and rubber plug).

Figure 17:
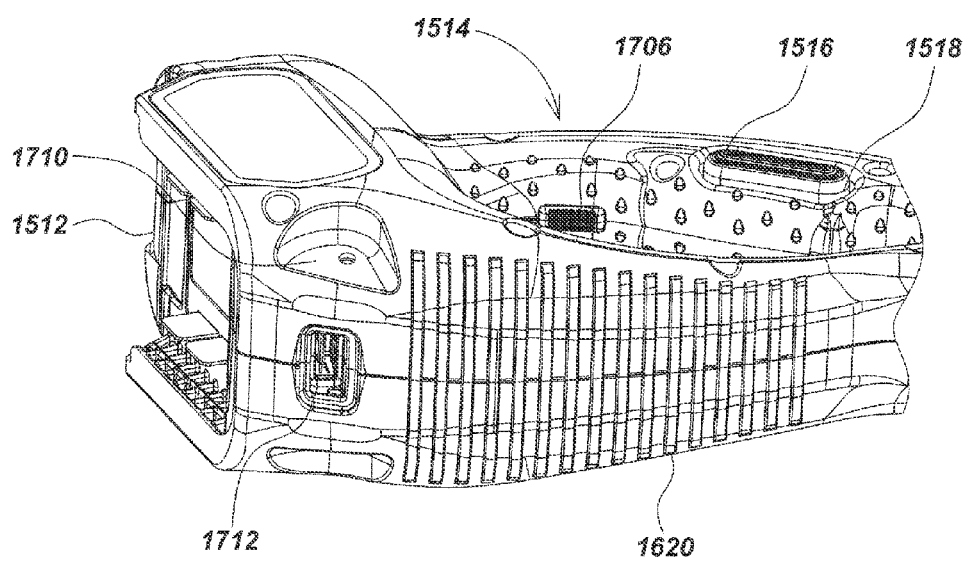
FIG. 17 is an enlarged perspective view of an alternate embodiment locator body.

FIG. 17 offers a different orientation from FIG. 16, and depicts a trigger 1706, a recess 1710 for the optical ground tracker mounting ear 1610, and a socket 1712 (e.g., a USB port) for a connection with the optical ground tracker component 1510 or another component (not shown).

Figure 7:
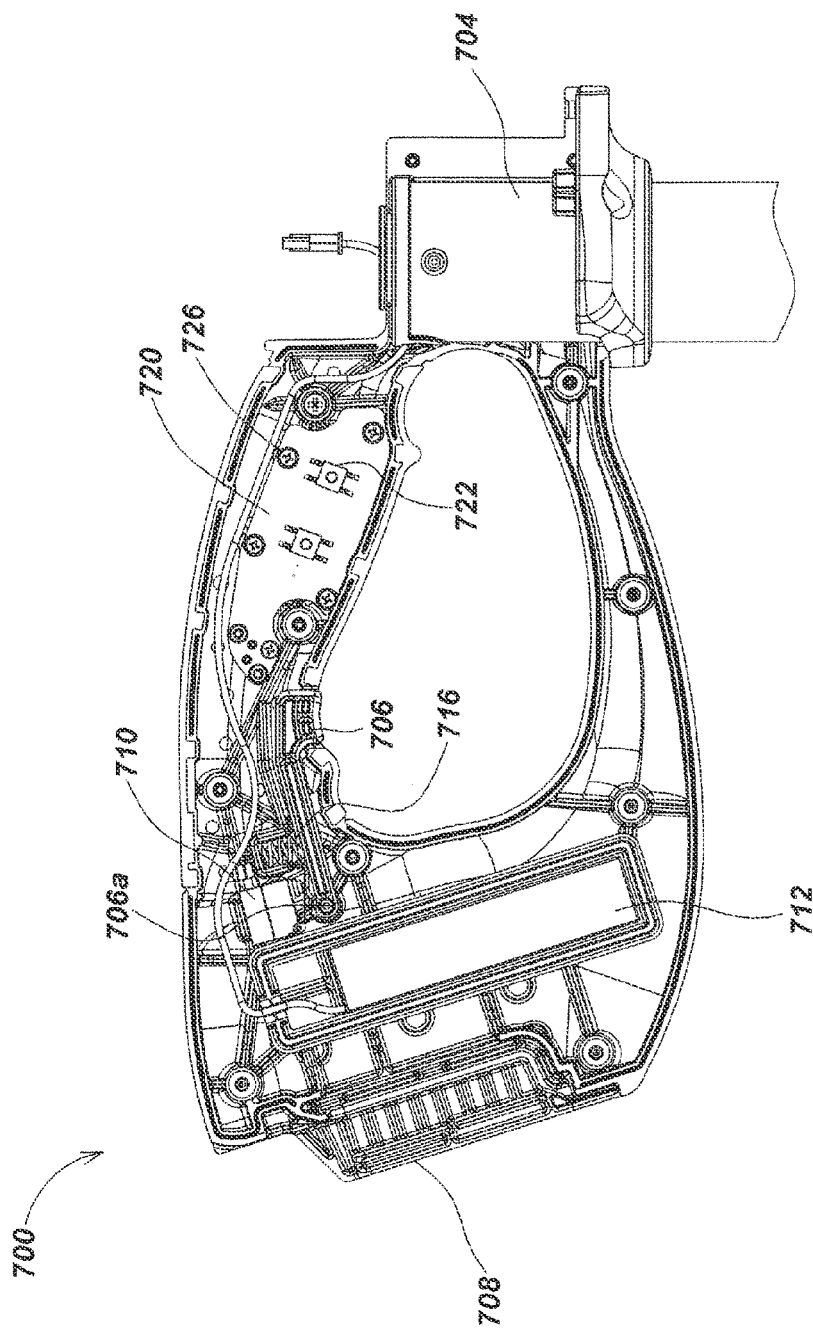
FIG. 7 is an exploded and cutaway view of an alternate embodiment haptic handle assembly of FIG. 6, illustrating details thereof.

Turning to FIG. 7, details of a left handle side embodiment 700 configured with a locator mast 704 is illustrated. For example, left handle side 700 may correspond to one of a pair of molded halves, which may be joined to form the handle assembly 614 (FIG. 6). A battery docking, such as battery docking area 708 may be used to mount a receiver 202 (FIG. 2) to interface with battery pack 132. A backup battery 712 may be used to provide power to the system, such as for example, system 100. One or more switch elements, such as tactile switch elements 722 may be disposed on a circuit board, such as a squeeze grip PCB 720, which may be mounted to the inner housing of left handle side 700 with one or more fasteners, such as a pair of screws 726. One or more vibrating elements, such as a left vibrating element 802 (not shown in FIG. 7) may be disposed behind squeeze grip PCB 720 and seated in a capsule (not shown) in the inside surface of left handle side 700.

A left vibrating element 802 (FIG. 8) and a trigger 706 may be electrically connected to PCB 720. The trigger 706 may be hinged at the pivot 706a and pushes down on the lever arm of a micro switch element 710. A spring element, such as spring 716, may be used to push the trigger 706 back out to its rest position. The micro switch 710 may be configured similarly to a micro switch disposed under the button of a computer mouse. For example, the button on the outside of a mouse may be depressed, and the micro switch 710 disposed underneath may provide the clicking sound and feel. When the micro switch 710 clicks, various circuitry and electronics may detect this action, which may be noted by the computer.

The trigger 706 may include pins (not shown) so the trigger may pivot at the hinge to activate the micro switch 710. In one aspect, trigger 706 may be actuated by an operator's pinky finger or other finger. Alternatively, a user may depress an external pad, such as for example, a left touch face 1052 (see FIG. 10), to activate tactile switch element 722 which may be used for marking points of interest along a locate job or other indications.

Figure 8:
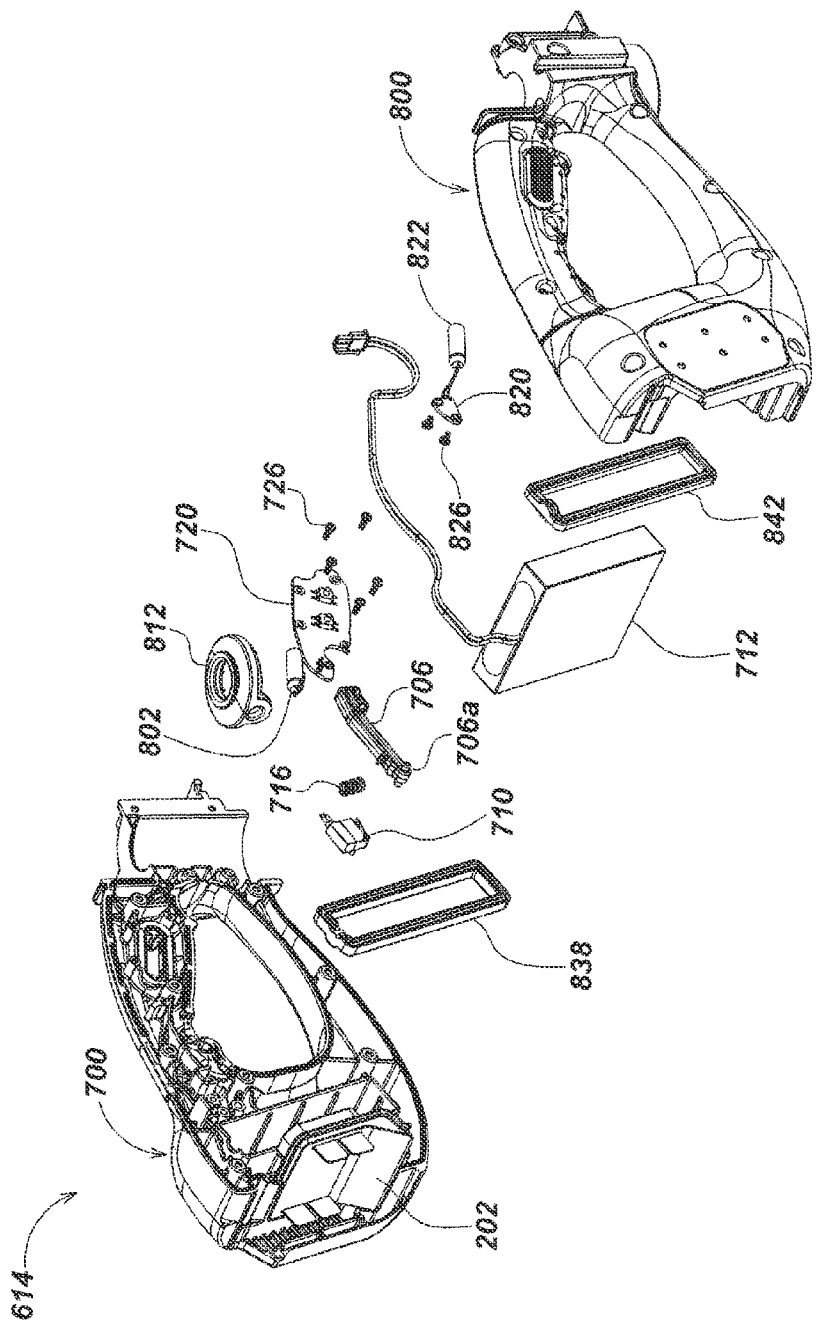
FIG. 8 is an exploded view of the alternate embodiment haptic handle assembly of FIG. 6.

Referring to FIG. 8, an exploded view of the alternate embodiment haptic handle assembly 614 of FIG. 6 is illustrated. A sealing element, such as cap seal 312, may be used to seal the mast 104 (FIGS. 1-2) where it joins the locator body 102 (FIGS. 1 and 2). Various elements may be included in haptic handle assembly 614, such as for example, a backup battery 712 (FIG. 7), which may be retained in a compartment disposed within a housing, such as mated left handle housing 700 and a right handle housing 800, and sealed with a left battery sealing element 838 and a right battery seal element 842. Backup battery 712 may be rechargeable and may supply power when the primary battery (e.g., battery 132) is removed.

In one aspect, a smaller circuit board, such as circuit board 820 may be electrically connected to squeeze grip PCB 720 with one or more pins, such as pogo pins 826. One or more vibrating elements, such as a left vibrating element 802 and a right vibrating element 822, may be electrically connected to PCB 720 and PCB 820, respectively to provide independent left-right feedback to the operator.

Still referring to FIG. 8, battery receiver 202 may be mounted on the surface of battery dock section (not shown) so it can electrically connect to a corresponding battery pack, such as for example, battery pack 132 (FIGS. 1 and 2). Squeeze grip PCB 720 may be mounted to the inner housing of left handle side 700 with one or more fasteners, such as screws 726. Trigger 706 including pivot element 706a, micro switch 710 and spring 716 may be disposed in left handle housing 700.

Figure 9:
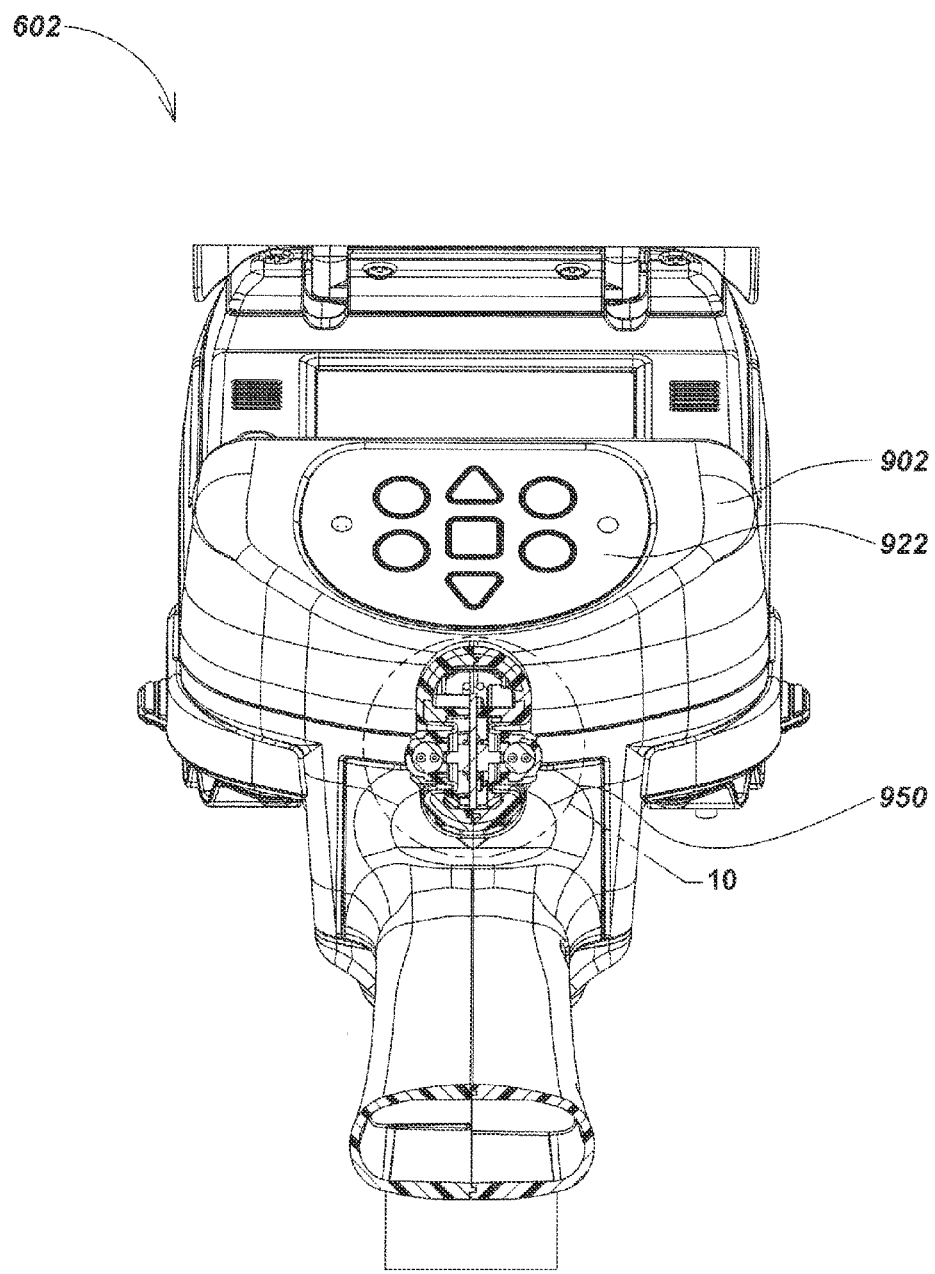
FIG. 9 is a section view of the alternate embodiment locator body, taken from line 9-9 of FIG. 6.

Referring to FIG. 9, a section view of the alternate embodiment locator body 602, taken from line 9-9 of FIG. 6, illustrates details. Locator body 902 may include a locator keypad 922. An enlarged section view illustrates details of the haptic interface 950.

Figure 10:
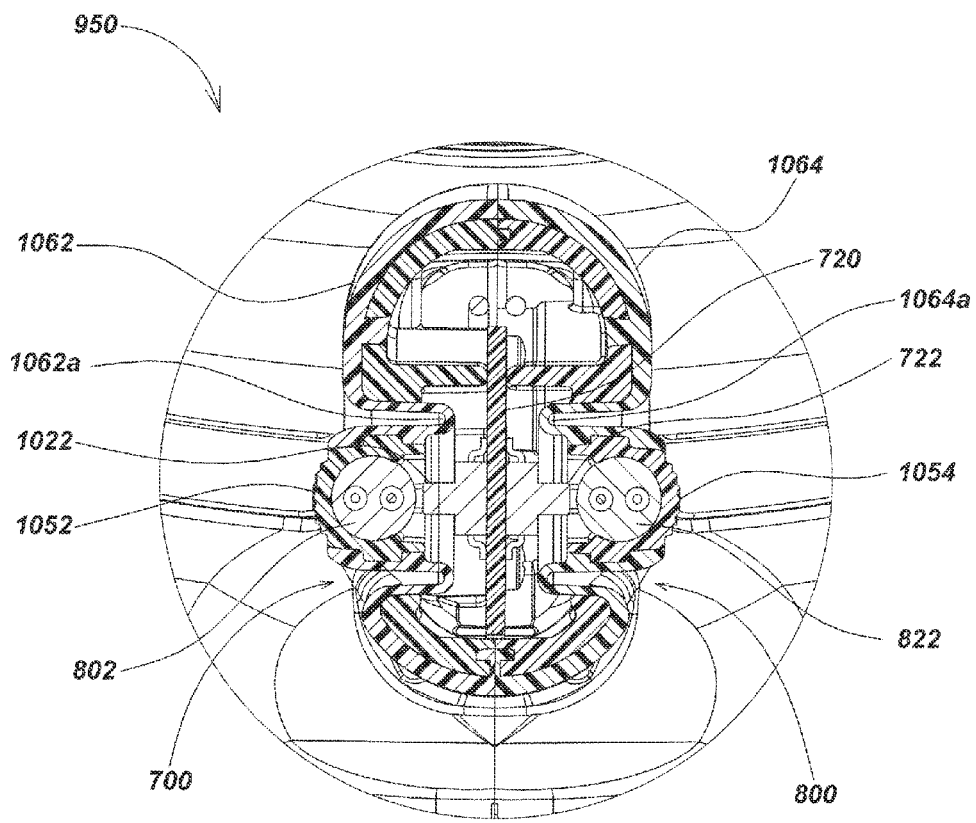
FIG. 10 is an enlarged section view of the alternate embodiment locator body as shown in FIG. 9, illustrating details thereof.

FIG. 10 is an enlarged section view of the haptic interface 950 of FIG. 9, illustrating details thereof. In one aspect, haptic interface 950 may include a pair of vibrating elements, such as the left vibrating element 802 (FIG. 8), which may be disposed within a left capsule of left touch face 1052, and the right vibrating element 822 (FIG. 8), which may be disposed within a left capsule of left touch face 1054. In one aspect, haptic interface 950 may include an overmold which may be formed by a left side overmold 1062 and a right side overmold 1064 mated together. The overmold may include one or more pleats, such as left pleat 1062a and right pleat 1064a. The purpose of this pleat or fold in the overmold is to allow the vibrating element to move (or "vibrate") independently from the rest of the handle. The independent movement allows the handle to provide directional (left and right) feedback to the operator. The vibrating elements essentially "float" in the overmold.

Still referring to FIG. 10, one or more tactile switch elements, such as a left tactile switch element 1022 and right tactile switch element 722 may be disposed on PCB 720. Left tactile switch element 1022 may be oriented to face left vibrating motor element 802, and right tactile switch element 722 may be oriented to face right vibrating motor element 822.

Figure 11A:
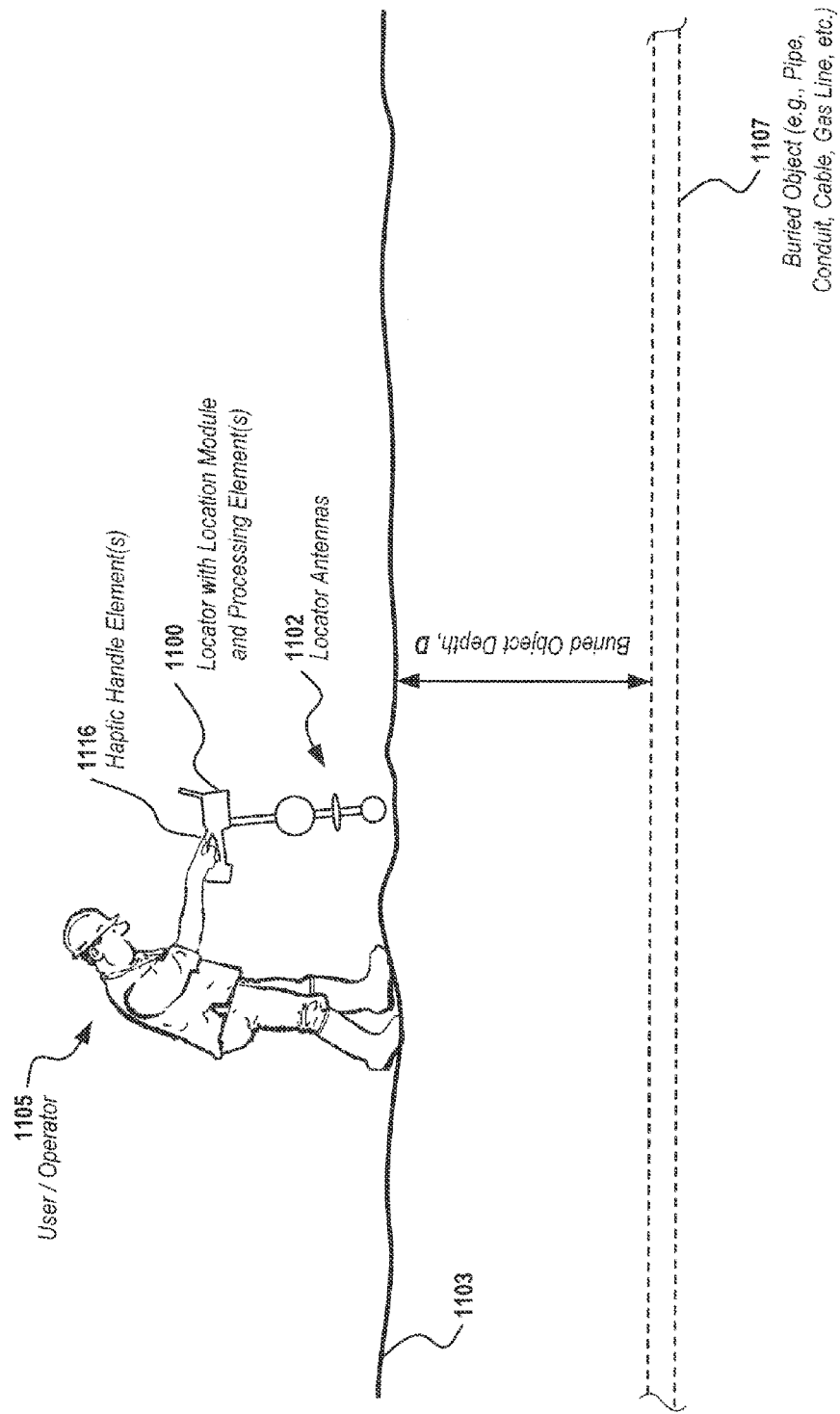
FIG. 11 illustrates details of an embodiment of processing element for use in processing locator signals to provide haptic feedback.

FIG. 11A illustrates an example usage of a locator device 1100 including a haptic handle 1116. An Operator 1105 may be doing an inspection or tracing operation to locate a buried object 1107 under the ground or other surface 1103 (e.g., grass, concrete, asphalt paving, building basement or between floors, etc.) at a depth D below the ground. The locator 1100 may include one or more magnetic field antennas 1102, which may be, for example, omnidirectional antenna arrays capable of sensing magnetic fields in two or more dimensions. In operation, the haptic handle element 1116 provided tactile feedback output, in the form of vibrations or other tactile feedback, to assist the user 1105 locate the buried object 1107, in X-Y axes (e.g., perpendicular to the direction of the depth, and/or in the Z-axis (e.g., along the direction of depth, D).

Figure 11B:
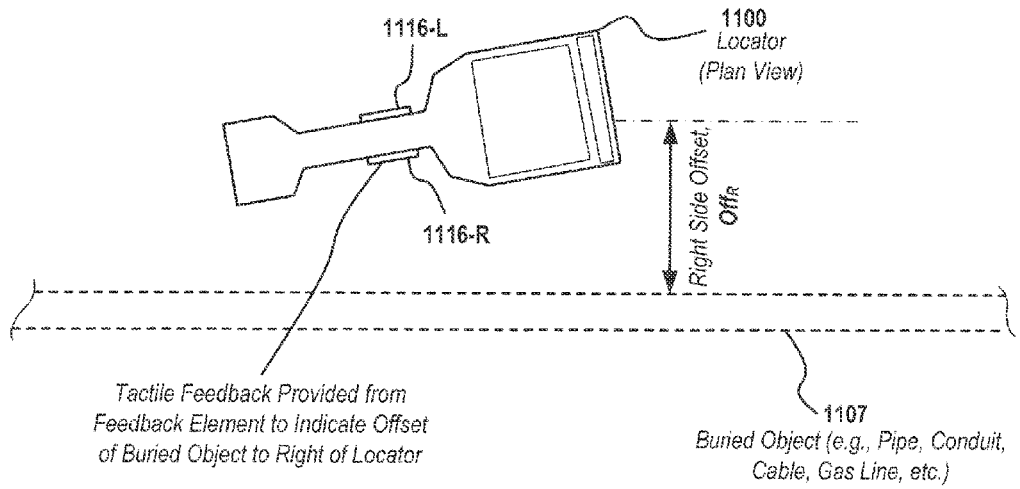

One example locate operation is shown in the plan view illustration of FIG. 11B. In this view, the locator is seen from above as it would appear to an operator looking toward the ground. In this example, the haptic handle includes two tactile feedback components, 1116-L and 1116-R, corresponding to left and right sides of the locator when viewed from above by an operator. Other embodiments may use fewer or more tactile feedback components, and those feedback components may be distributed on the handle in various positions, such as in a linear or grid array, around the handle from top to bottom, and the like. In the example of FIG. 11B, the buried object 1107 is located below the ground to the right of the operator (e.g., Right Side Offset as shown). Upon sensing the location or position of the buried object 1107, the locator and associated processing module may generate haptic feedback to direct the operator to or indicate the direction of the buried object relative to the locator. For example, the right side element 1116-R may be actuated, creating a buzzing sensation on the user's hand on the right side. Other tactile feedback outputs indicating the relative direction, position, and/or location of the buried object may also be used.

Figure 11C:
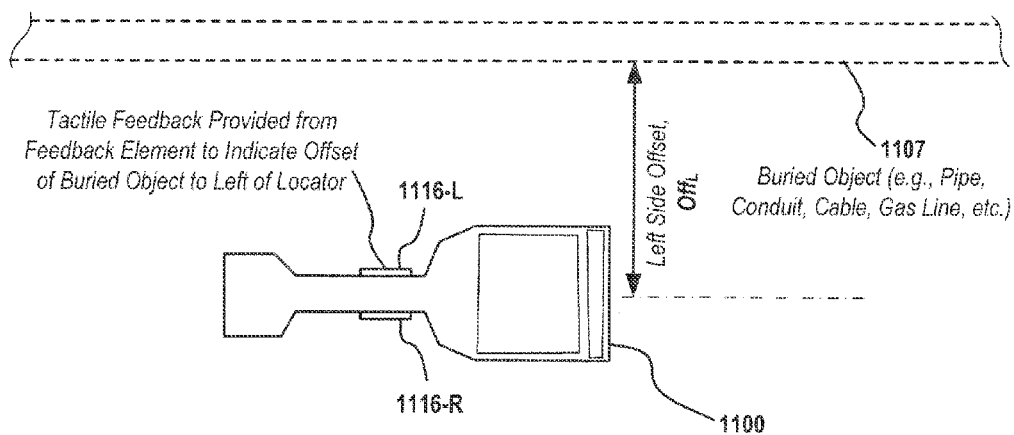

FIG. 11C illustrates a similar example to that of FIG. 11B, with the locator 1100 offset in this example to the right of the buried object (the buried object is located on the operator's left side, at a Left Side Offset). In this case, the left side tactile feedback component 1116-L may be actuated to indicate the relative direction to the buried object. Alternately, combinations of left and right side tactile elements may be actuated in various embodiments, such as to indicate angles, relative distances, depths to the object, and the like. In addition, other tactile parameters, such as amplitude modulation, frequency, on/off time, and the like may be controlled to provide directional and/or depth feedback. In some embodiments, multiple buried objects may be detected and signaled to the user by providing distinctive feedback for each object.

Figure 12:
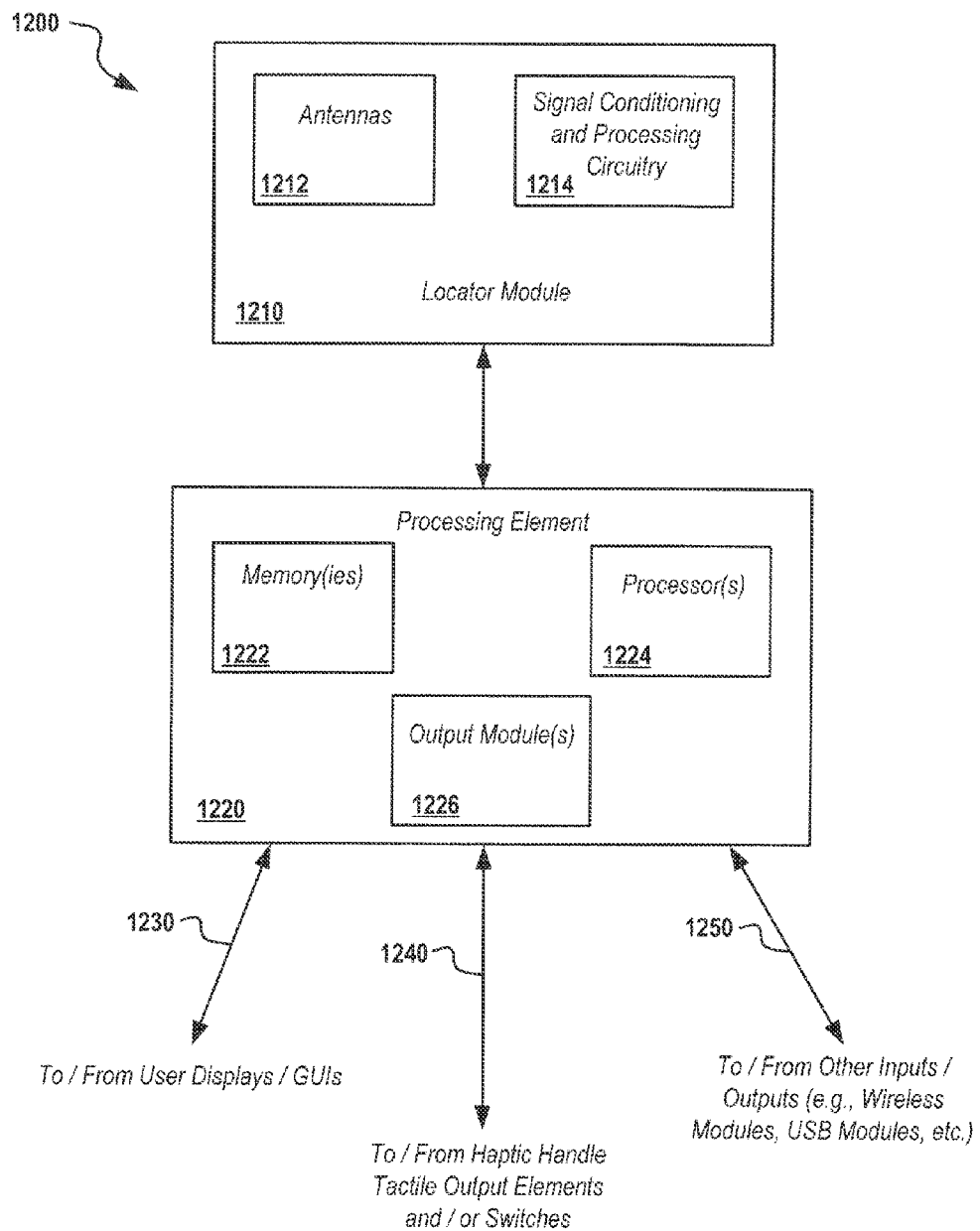
FIG. 12 illustrates details of an embodiment of a method for providing haptic feedback using a haptic handle such as shown in FIG. 2 or 7.

FIG. 12 illustrates a block diagram of certain details of one embodiment of a locator system 1200 for providing haptic feedback. System 1200 may include a locator module embodiment 1210 and a processing element or module 1220, which may be coupled to the locator module and receive location and/or position and/or depth signals or information from it. Locator module 1210 may include one or more antennas 1212, which may be single direction, or omnidirectional magnetic field antennas or antenna arrays. The antennas 1212 may be coupled to a signal condition and processing circuit 1214, which may process the antenna signals and generate output signals to be provided to the processing element 1220. Processing element 1220 may include one or more processor 1224 or other programmable devices, one or more memories 1222, and other electronic circuits, such as one or more output modules 1226 for generating output signals for controlling operation of the tactile elements via connection(s) 1240. Processing element 1220 may further include interfaces for receiving and/or sending data or information to user display devices, GUIs, etc., via connection 1230, and may also include interfaces to or from outer inputs or outputs via connections 1250, such as wireless modules, USB modules, other serial or parallel interfaces, analog signaling interfaces, and the like. Various additional details of embodiments of antennas 1212 and processing elements 1220 are described in the incorporated applications and may be used in conjunction with the disclosures herein.

Figure 13:
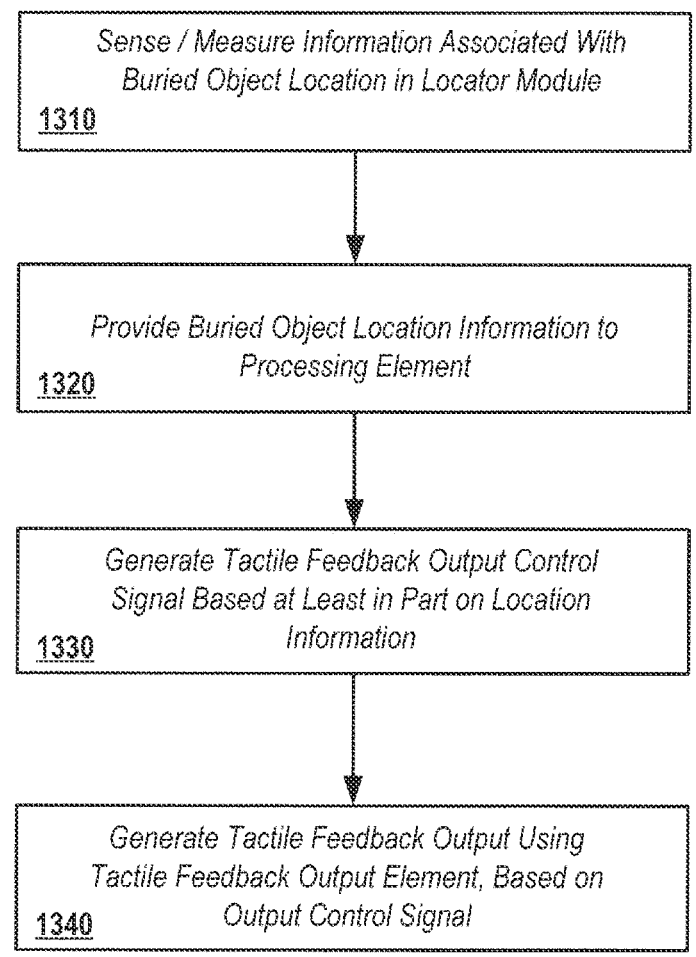
FIG. 13 illustrates details of a buried object location operation and associated tactile feedback.

FIG. 13 illustrates details of a process embodiment 1300 for providing tactile feedback in a locator or other device. At stage 1310, information associated with a buried object, such as position, location, and/or depth may be measured or sensed, such as described in the incorporated applications. This may be done in a locator module 1210, such as through use of antennas 1212 and circuitry 1214, and then processed in a processing element, such as processing element 1220 as shown in FIG. 12.

At stage 1320, the buried object information may be provided to the processing element.

At stage 1330, an output signal, such as a tactile feedback control signal to control generation of tactile feedback from a tactile feedback component such as shown in FIGS. 11A-11C, may be generated. The signal may be generated at least in part based on location, position, orientation and/or depth information provided from the locator module.

At stage 1340, tactile user feedback may be generated, such as in the form of controlled vibration or other tactile feedback output. The generated tactile feedback may be controlled by the output control signal provided from the processing element.

The process 1300 may further include, for example, receiving a switching input from a switch disposed in proximity to one of the tactile feedback components, and generating a control signal in the locator based on the received switching input.

The one or more tactile feedback components may include a pair of tactile feedback components, and the process 1300 may further include generating tactile feedback control signals in a processing element.

Figure 14:
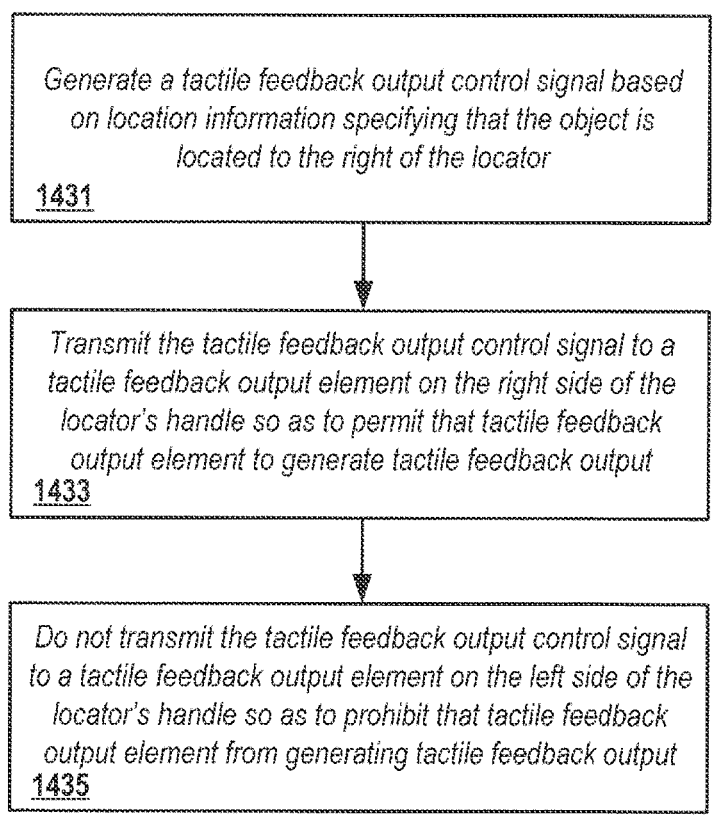
FIG. 14 illustrates details of a buried object location operation and associated tactile feedback control.

Tactile feedback control signals may correspond to any of a variety of navigation information. For example, the signals may correspond to direction (e.g., right or left) from the current position of the buried object locator towards the location of the buried object. FIG. 14, by illustration, shows one implementation of stage 1330 for controlling two feedback components to indicate that a buried object is located to the right of a buried object locator. At stage 1431, a tactile feedback output control signal is generated based on location information specifying that the object is located to the right of the locator. At stage 1433, the tactile feedback output control signal is transmitted to a tactile feedback output element on the right side of the locator's handle so as to permit that tactile feedback output element to generate tactile feedback output. At stage 1435, the tactile feedback output control signal is not transmitted to a tactile feedback output element on the left side of the locator's handle so as to prohibit that tactile feedback output element from generating tactile feedback output.

The signals may, of course, correspond to any directional angle of travel, and feedback components may be controlled accordingly using modulation, activating any number of feedback components, and activating different feedback components or using different modulation in a particular order. The signals may alternatively or additionally correspond to a distance of the buried object relative to a location of the buried object locator, or a depth of the object.

Where only two feedback components are used on opposite sides of the handle, selective activation of the right and/or left feedback component using different modulation may indicate relative degrees of direction and distance to the buried object with respect to an orientation of the buried object locator. For example, a longer activation period of the left feedback component simultaneous with or followed by a shorter activation period of the right feedback component may indicate a directional angle between the front and left of a user. Activation of each feedback component at the same time may indicate that the buried object is located in front of the user. Activation of feedback components in a particular, sequential order may indicate a rotational direction in which the user may turn so that the location of the buried object eventually aligns with the front of the user, or so the user may walk along the buried object. Also, depth information may be provided by varying the activation and modulation of particular feedback components.

One of skill will readily understand various combinations of amplitude, frequency, and time modulation that may be used to indicate position information. Furthermore, one of skill in the art will appreciate various combinations of serial and/or simultaneous activation patterns of one or more feedback components that may be used to indicate position information. One of skill in the art will further appreciate various combinations of activation patterns and modulation that may be used to indicate position information.

For example, a feedback component may be configured to provide a number of pulses, a length of a pulse, an amplitude of a pulse, or a pause of certain duration between pulses to indicate a number of measurement units between the user/locator and the object. The feedback component may later provide a different number, length, amplitude, or pause when the user/locator has moved closer or farther away from the object. The measurement units may correspond to imperial or metric units of measurement, or a user-specific measurement unit such as a typical stride of the user or the remaining time to the object based on the user's speed. One of skill in the art will appreciate that alternative types of tactile feedback may be provided as opposed to pulses, including vibration, electric shock, and others.

By way of another example, two or more feedback components may be configured to sequentially provide tactile feedback so as to indicate a direction of rotation in which the user may rotate in order to align the user along a path to the object or along a length of the object. For example, the tactile feedback may indicate a clockwise direction of rotation about a vertical axis of the user when the tactile feedback includes tactile feedback from a first feedback component at a first instance of time, tactile feedback from a second feedback component at a second instance of time after the first instance of time, and (optionally) tactile feedback from a third feedback component at a third instance of time after the second instance of time. The feedback from each feedback component may be modulated to further specify the direction of rotation and the degree of rotation. Of course, activation of only one feedback component may indicate a direction of rotation (e.g., activation of a right-side feedback component to indicate clockwise rotation).

When indicating a direction, the feedback components may be controlled to direct a user in an indirect direction with respect to the object so that the user avoids certain hazards when moving. The indirect direction may be generally in the direction of the object, but may not necessarily guide the user to the object along the shortest path to the object. For example, if an object is located on the other side of a fence, the feedback components may be controlled to guide the user in a direction to the nearest opening of the fence. Once the user passes through the opening, the feedback components may be controlled to guide the user along the short path to the object from the opening. The feedback components could similarly guide a user around vehicular traffic, or around an obstacle like a lamp post or other object beyond the view of a user.

One of skill in the art will appreciate that auditory feedback using speakers or other sound-emitting components to convey position information is also contemplated. Use of multiple speakers positioned at different directions from a user's ear(s) may provide position information. Speakers may be mounted on the user's body or otherwise positioned within an audible distance to the user. Control of the speakers may be implemented using any of the wireless means and methods disclosed herein, including wireless control from a buried object locator or smart phone using known wireless technologies. Although the position of speakers may vary, in one example speakers are positioned behind, in front, at the sides, and/or at any angle from the user's ears in order to permit directional navigation and conveying of various position and environmental information. As with tactile feedback, auditory feedback may be modulated in time, frequency and amplitude. Different sounds may also be used to convey different information.

One of skill in the art will also appreciate that certain aspects described herein may apply to navigation in general, including navigation of users who are blind or have issues with vision, and navigation of users (e.g., shoppers, tourists, etc.) in urban or other environments. For example, certain aspects may be applied to providing indications of direction away from obstacles, or direction towards certain locations (e.g., a commercial establishment matching a predefined characteristic like offering a desired product or service.

While "object" used above refers to physical objects in real environments, one of skill in the art will also appreciate that certain aspects described herein may apply to providing directional information in virtual game play where the directional information is provided based on locations of a virtual player, a virtual (i.e., nonphysical) object, and/or virtual conditions. Of course, there are many differences between providing directional information using tactile feedback based on virtual game play environments as compared to using tactile feedback based on real (i.e., physical) environments. For instance, variables and information relating to the virtual and real environments are determined, provided and used by different components. For example, in a virtual world, information regarding the environment is based on coded rules and stored definitions of virtual objects. Real world information, on the other hand, is based on detected conditions physical properties and technologies (e.g., mapping and location technologies, sensors, physical characteristics of objects and environment). Although certain feedback may be applied to both virtual and real world environments, the basis of that feedback and how it is conveyed to a user will vary between the environments.

In some configurations, the apparatus, circuit, modules, or systems described herein may include means for implementing features or providing functions described herein, such as for determining location, position, and/or depth information and generating tactile output signals and tactile output from tactile feedback components. In one aspect, the aforementioned means may be a module including a processor or processors, associated memory and/or other electronics in which embodiments of the invention reside, such as to implement signal processing, switching, transmission, or other functions to process and/or condition tactile outputs, locator inputs or outputs, and/or provide other electronic functions described herein. These may be, for example, modules or apparatus residing in buried object locators and/or other related equipment or devices.

In one or more exemplary embodiments, the electronic functions, methods and processes described herein and associated with locators may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in any processes or methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the embodiments disclosed herein may be implemented as electronic hardware, computer software, electro-mechanical components, or combinations thereof Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to locators, processing elements, and haptic feedback components, controls, and apparatus may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

As used herein, any reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Accordingly, the disclosure is not intended to be limited to the aspects shown herein, but is to be accorded the widest scope consistent with the aspects and features shown and described herein in the specification and drawings.

What is claimed is:

1. A system for providing tactile feedback in a buried object locator, the system comprising:
   two or more feedback components disposed in or coupled to a handle of the buried object locator and configured to provide the tactile feedback based on position information relating to determined position information of a buried physical object based on magnetic field signals received at the buried object locator that are emitted from the buried physical object;
   wherein the tactile feedback includes providing a first tactile feedback output from a first tactile feedback component while providing no tactile feedback output from a second tactile feedback component to indicate a direction towards a location of the buried object.

2. The system of claim 1, wherein the tactile feedback is associated with a relative position of the user with respect to the determined location of the physical object.

3. The system of claim 2, wherein the one or more feedback components includes a plurality of feedback components configured to physically contact the user's body.

4. The system of claim 3, wherein the plurality of feedback components are integrated with or coupled to clothing worn by the user.

5. The system of claim 1, wherein the tactile feedback indicates a direction from the user towards the physical object.

6. The system of claim 5, wherein the tactile feedback further indicates a determined amount of distance between the user and the physical object.

7. The system of claim 6, wherein the tactile feedback further indicates a determined depth of the physical object below a surface.

8. The system of claim 1, wherein the tactile feedback indicates an amount of distance between the user and the physical object.

9. The system of claim 8, wherein at least one feedback component provides one or more of time modulated, amplitude modulated, and frequency modulated tactile feedback to indicate a determined amount of distance between the user and the physical object.

10. The system of claim 9, wherein the tactile feedback further indicates a determined direction of travel towards the physical object, and at least one feedback component provides one or more of time modulated, amplitude modulated, and frequency modulated tactile feedback to indicate the direction of travel.

11. The system of claim 1, wherein the tactile feedback indicates an orientation of the user with respect to the determined location of the physical object.

12. The system of claim 1, wherein the tactile feedback indicates a determined depth of the physical object below a surface.

13. The system of claim 1, wherein at least one feedback component provides time modulated tactile feedback.

14. The system of claim 1, wherein at least one feedback component provides amplitude modulated tactile feedback.

15. The system of claim 14, wherein the at least one feedback component is configured to provide different amplitude modulated tactile feedback associated with different amounts of determined distance between the user and the physical object at different instances of time.

16. The system of claim 1, wherein at least one feedback component provides frequency modulated tactile feedback.

17. The system of claim 1, wherein at least one feedback component is configured to provide a first number of activation periods corresponding to a first number of measurement units to indicate a first determined amount of distance between the user and the physical object at a first instance in time.

18. The system of claim 17, wherein the at least one feedback component is further configured to provide a second number of activation periods corresponding to a second number of measurement units to indicate a second determined amount of distance between the user and the physical object at a second instance in time, and wherein the second number of activation periods and the second number of measurement units are both less than the first number of activation periods and the first number of measurement units when the second amount of distance is less than the first determined amount of distance, and the second number of activation periods and the second number of measurement units are greater than the first number of activation periods and the first number of measurement units when the second amount of determined distance is greater than the first amount of determined distance.

19. The system of claim 1, further comprising:
   the buried object locator, wherein the buried object locator includes:
   the one or more feedback components disposed within a handle of the buried object locator; and
   a magnetic field locator module configured to determine the position information relating to the location of the buried object based on the magnetic fields received from the buried object.

20. The system of claim 19, further comprising:
   a processing module configured to generate, based at least in part on the position information, one or more control signals, wherein the one or more feedback components provide the tactile feedback based on the control signals.

21. The system of claim 20, wherein:
   a first feedback component is configured to provide first tactile feedback based on a first control signal, and a second feedback component is configured to provide no tactile feedback at a first instance of time to indicate a first direction in which the user may travel towards the object, and
   the second feedback component is further configured to provide second tactile feedback based on a second control signal, and the first feedback component is further configured to provide no tactile feedback at a second instance of time to indicate a second direction in which the user may travel towards the object.

22. The system of claim 19, wherein the one or more feedback components includes a first feedback component disposed on a first side of the handle and a second feedback component disposed on a second side of the handle.

23. The system of claim 19, wherein the one or more feedback components includes an array of three or more feedback components.

24. The system of claim 19, wherein the one or more feedback components includes a plurality of feedback components configured to sequentially provide tactile feedback so as to indicate a direction of rotation in which the user may rotate in order to align the user along a path to the object.

25. The system of claim 24, wherein the tactile feedback indicates a clockwise direction of rotation about a vertical axis from the ground when the tactile feedback includes tactile feedback from a first feedback component at a first instance of time, and tactile feedback from a second feedback component at a second instance of time after the first instance of time.

26. The system of claim 19, wherein the tactile feedback indicates one or more of a determined direction in which the user may travel towards the object, an amount of determined distance between the user and the object, and a determined depth of the object below a surface.

27. The system of claim 26, wherein tactile feedback indicating the determined direction includes tactile feedback from a first feedback component and no tactile feedback from a second feedback component, and wherein tactile feedback indicating the determined amount of distance is modulated so as to provide more frequent tactile feedback as the amount of distance decreases over a time period.

28. The system of claim 19, wherein at least one feedback component provides one or more of time modulated, amplitude modulated, and frequency modulated tactile feedback.

29. The system of claim 1, wherein the position information is based at least in part on GPS location technologies.

30. The system of claim 1, wherein at least one of the feedback components is configured to provide audio feedback based on the determined position information relating to the location of the object and further based on a determined location and determined orientation of the user relative to the location of the objects.

31. The system of claim 1, wherein the tactile feedback is further based on information relating to an obstacle or hazard in the same environment of the object.

32. The system of claim 1, wherein the provided tactile feedback indicates a relative position of the buried object locator with respect to the determined location of the buried object.

33. The system of claim 1, wherein the provided tactile feedback indicates one or more of a direction towards location of the buried object, an amount of distance to the location of the buried object, and a depth of the buried object below a surface.

34. The system of claim 1, wherein the provided tactile feedback is modulated in one or more of time, frequency, and amplitude.

35. The system of claim 1, wherein one or more control signals, are generated based on the position information, and wherein a feedback component provides the tactile feedback based on the one or more control signals.

36. The system of claim 1, wherein a first feedback component is disposed on a first side of the handle and a second feedback component is disposed on a second side of the handle.

37. The system of claim 1, wherein the tactile feedback indicates an amount of distance between the user and the physical object.

38. The system of claim 1, wherein the tactile feedback indicates an orientation of the user with respect to the determined location of the physical object.

39. The system of claim 1, wherein the tactile feedback indicates a determined depth of the physical object below a surface.

40. The system of claim 39, wherein the tactile feedback further indicates a determined amount of distance between the user and the physical object.

41. The system of claim 1, wherein at least one feedback component provides time modulated tactile feedback.

42. The system of claim 1, wherein at least one feedback component provides amplitude modulated tactile feedback.

43. The system of claim 1, wherein at least one feedback component provides frequency modulated tactile feedback.

44. The system of claim 1, wherein at least one feedback component provides one or more of time modulated, amplitude modulated, and frequency modulated tactile feedback to indicate a determined amount of distance between the user and the physical object.

45. The system of claim 44, wherein the tactile feedback further indicates a determined direction of travel towards the physical object, and at least one feedback component provides one or more of time modulated, amplitude modulated, and frequency modulated tactile feedback to indicate the direction of travel.

46. The system of claim 1, wherein at least one feedback component provides a first number of activation periods corresponding to a first number of measurement units to indicate a first determined amount of distance between the user and the physical object at a first instance in time.

* * * * *